(12) United States Patent
Livis et al.

(10) Patent No.: US 11,687,272 B2
(45) Date of Patent: Jun. 27, 2023

(54) METHOD AND SYSTEM FOR DYNAMIC TOPOLOGY-AWARE SPACE ALLOCATION IN A DISTRIBUTED SYSTEM

(71) Applicant: Hewlett Packard Enterprise Development LP, Houston, TX (US)

(72) Inventors: Yann Livis, Bedminster, NJ (US); Dmitry L. Ivanov, Branchburg, NJ (US); Oleg Neverovitch, Hillsborough, NJ (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 89 days.

(21) Appl. No.: 17/359,080

(22) Filed: Jun. 25, 2021

(65) Prior Publication Data
US 2022/0413741 A1 Dec. 29, 2022

(51) Int. Cl.
G06F 3/06 (2006.01)

(52) U.S. Cl.
CPC ............ *G06F 3/0655* (2013.01); *G06F 3/064* (2013.01); *G06F 3/0604* (2013.01); *G06F 3/067* (2013.01)

(58) Field of Classification Search
CPC ...... G06F 3/0655; G06F 3/0604; G06F 3/064; G06F 3/067
See application file for complete search history.

(56) References Cited

U.S. PATENT DOCUMENTS

| | | | | |
|---|---|---|---|---|
| 7,434,091 | B1* | 10/2008 | Karr | G06F 3/0683 711/114 |
| 8,555,022 | B1* | 10/2013 | Edwards | G06F 3/0632 711/170 |
| 8,732,518 | B2* | 5/2014 | Storer | G06F 11/008 714/6.1 |
| 10,324,644 | B2 | 6/2019 | Ma et al. | |
| 2012/0266011 | A1* | 10/2012 | Storer | G06F 11/008 714/1 |

(Continued)

OTHER PUBLICATIONS

"Lustre Wiki", available online at <https://wiki.lustre.org/index.php?title=Main_Page&oldid=3542>, Jun. 13, 2019, 3 pages.

(Continued)

*Primary Examiner* — Ryan Bertram
(74) *Attorney, Agent, or Firm* — Park, Vaughan, Fleming & Dowler LLP

(57) ABSTRACT

A system divides non-volatile memory of a plurality of storage devices into physical extents which comprises chunks. The system allocates slabs associated with the storage devices, wherein a respective slab comprises extents from different storage devices and further comprises stripes. A stripe comprises a chunk from each extent of the respective slab. The system updates, in a first data structure, an entry which indicates: a slab number for the respective allocated slab; and a storage device identifier and an extent number for each extent in the respective allocated slab. Responsive to receiving a write request, the system obtains a first stripe from a pre-allocated list which includes the allocated slabs. The system searches, based on stripe information associated with the first stripe, the first data structure to obtain a physical location in a storage device to which to issue the write request.

20 Claims, 11 Drawing Sheets

(56) References Cited

U.S. PATENT DOCUMENTS

| | | | |
|---|---|---|---|
| 2013/0067159 A1* | 3/2013 | Mehra | G06F 11/1451 |
| | | | 711/E12.019 |
| 2015/0019807 A1* | 1/2015 | Malkin | G06F 3/0608 |
| | | | 711/114 |
| 2015/0277794 A1* | 10/2015 | Tudor | G06F 3/0619 |
| | | | 711/103 |
| 2016/0266799 A1* | 9/2016 | Patel | G06F 3/065 |
| 2017/0322748 A1* | 11/2017 | Subramaniam | G06F 3/0673 |
| 2020/0065012 A1* | 2/2020 | Breslow | G06F 3/0604 |

OTHER PUBLICATIONS

Daos, "Storage Model", DAOS v1.0, available online at <https://web.archive.org/web/20200911044501/https://daos-stack.github.io/overview/storage/>, Sep. 11, 2020, 7 pages.

Github, "LevelDB", available online at <https://github.com/google/leveldb>, May 25, 2021, 7 pages.

Github, "UnifyFS: A file system for burst buffers", available online at <https://web.archive.org/web/20201023133747/https://unifyfs.readthedocs.io/en/dev/>, Oct. 2, 2020, 2 pages.

Greenberg et al., "MDHIM: A Parallel Key/Value Framework for HPC", Proceedings of the 7th USENIX Conference on Hot Topics in Storage and File Systems , 2015, 5 pages.

Open Fabrics Interfaces Working Group, "Libfabric", available online at <https://web.archive.org/web/20190111215246/https://ofiwg.github.io/libfabric/>, Jan. 11, 2019, 3 pages.

\* cited by examiner

METHOD AND SYSTEM FOR DYNAMIC TOPOLOGY-AWARE SPACE ALLOCATION IN A DISTRIBUTED SYSTEM

BACKGROUND

Field

This disclosure is generally related to the field of data management. More specifically, this disclosure is related to a method and system for dynamic topology-aware space allocation in a distributed system.

BRIEF DESCRIPTION OF THE FIGURES

In the figures, like reference numerals refer to the same figure elements.

DETAILED DESCRIPTION

Figure 1:
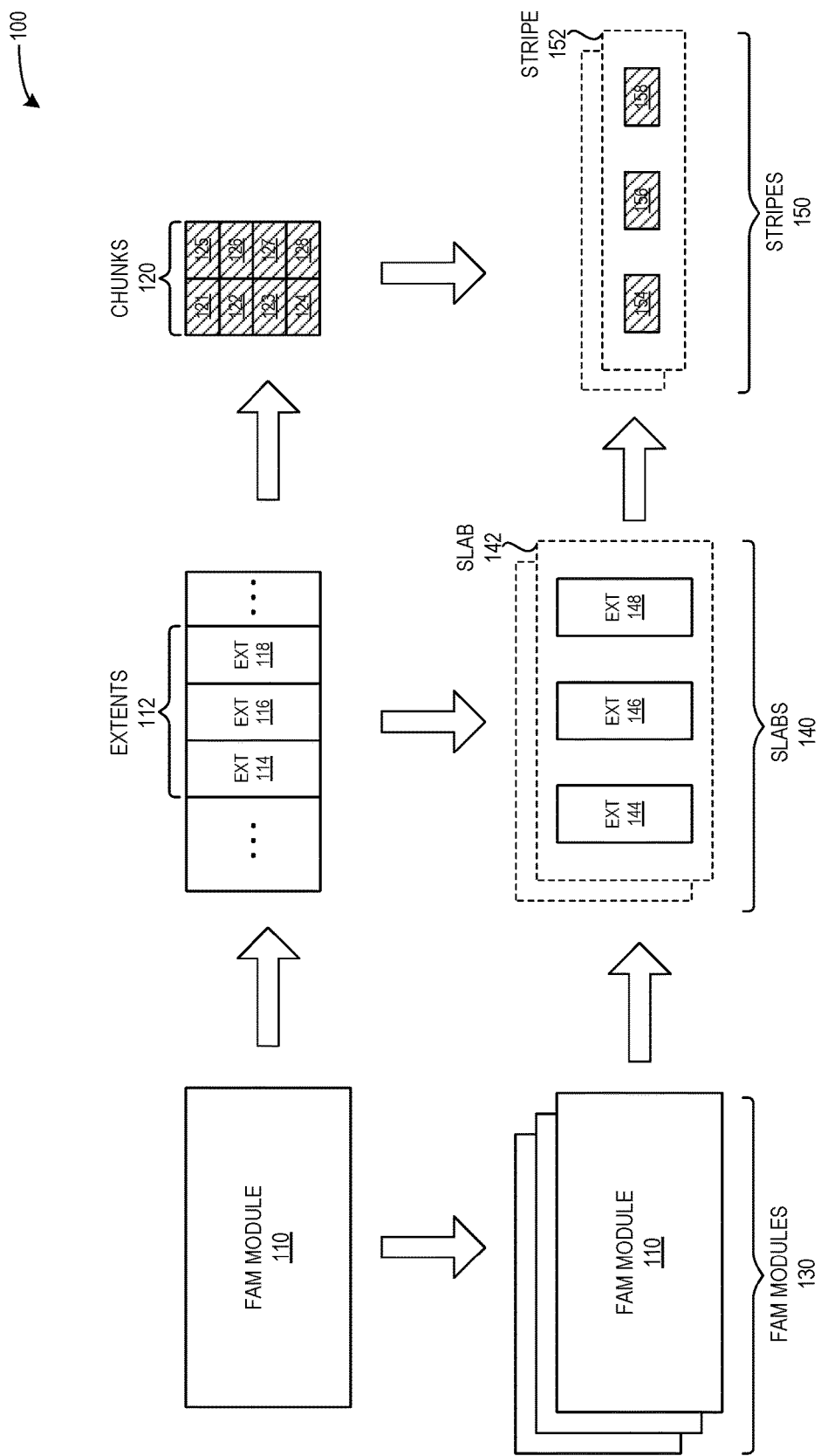
FIG. 1 illustrates a diagram of an exemplary allocation of space in a fabric attached memory (FAM) filesystem in accordance with an aspect of the present application.

The following description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

In a distributed system or cluster with multiple components across multiple devices, applications may use a checkpoint/restart mechanism to handle failures related to the components. The overhead involved in the checkpoint/restart mechanism can affect the efficiency and performance of the overall system. Achieving a write performance which saturates the underlying storage media may be obtained by eliminating contention between writer processes, which can result in eliminating the need for locking.

In a traditional distributed filesystem, one common area of contention is space allocation. An improvement in space allocation can result in a significant improvement in the performance of the filesystem.

The aspects described herein provide a system which addresses space allocation, which is a common point of contention in traditional distributed filesystems, and in Gen-Z based fabric attached memory (FAM) filesystem for high-performance computing (HPC). The described system can provide dynamic topology-aware space allocation by spreading allocations across FAM modules, organizing media into allocation groups as fault domains, using metadata maps, implementing pre-allocation queues, and providing dynamic asynchronous erasure coding (EC) in parallel with input/output (I/O) operations.

Fabric attached memory (FAM) can be accessible via a Gen-Z interconnect and can provide performance benefits when used in a parallel environment. Gen-Z can be optimized to support memory-semantic communications using a packet-based transport to access resources of components (e.g., FAM) or cause components to perform specific actions on its resources (e.g., memory side accelerator). Emerging storage class memory can be accessed via a high-bandwidth and low-latency interconnect to achieve improved I/O bandwidths and rates when used by a distributed filesystem. As an example, a FAM filesystem (FAMfs) may be used to achieve much higher performance in the checkpoint/restart process than may be possible when using traditional flash-based burst buffers (as currently used in HPC I/O subsystems). However, achieving this performance potential in a filesystem-based environment can be challenging.

HPC applications can use checkpoint/restart as a mechanism to tolerate the failure of cluster components. The Job Mean Time to Interrupt (JMTTI) for N nodes generally scales with 1/N, and the memory footprint generally scales with N. Due to the need to checkpoint N times more memory in 1/N the time, the checkpoint bandwidth to I/O nodes can scale as $N^2$. Thus, the challenge exists for an exascale I/O system to supply sufficient bandwidth to minimize overhead related to the checkpoint/restart mechanism.

The aspects of the system described herein achieve an improvement in space allocation by providing dynamic topology-aware space allocation which can support a high-bandwidth multi-tiered FAM filesystem. The system can present the underlying storage media as a set of virtual address spaces with pre-defined geometries and reliability levels (i.e., filesystem layouts). The FAM filesystem can also organize the underlying storage media into allocation groups as fault domains, where the address space can be organized into chunks and the FAM itself can be allocated in extents. The system can allocate extents from different FAM modules as part of a specific slab, which can facilitate a data protection scheme which can be configured at the file level. A description of the organization of FAM address space and the allocation of FAM modules into extents is provided below in relation to FIG. 1. The system can place data in a topology-aware manner, e.g., placing related data chunks on FAM modules from different fault domains, which can protect the FAM filesystem from the failure of a component, as described below in relation to FIG. 2.

The FAM filesystem can use a distributed key value store for the various metadata. The FAM filesystem metadata can include several metadata maps or data structures, as described below in relation to FIG. 3. These metadata maps or data structures can store, manage, and maintain information relating to the layout of the filesystem and the geometry of the organized virtual address space. Some of these metadata maps may be based on a persistent partitionable distributed map ("F-Map") implemented in FAMfs.

Specifically, the described system can allocate space via allocator modules in I/O nodes and allocator helper modules in compute nodes, as described below in relation to FIG. 4, while taking into account the specific topology of the system. The system can spread allocations evenly across all available FAM modules in the filesystem pool to achieve the highest possible I/O bandwidth, and can also eliminate or reduce contention for space allocation by performing pre-allocation at both the I/O node allocator level and the compute node allocator helper level. The system can further eliminate or reduce contention between allocator processes which run on different I/O nodes by partitioning certain metadata maps used by the I/O nodes. Certain metadata maps can be implemented as global bitmap arrays which can support space allocation across all FAM modules without the need for cluster-wide locks, e.g., by using libfabric atomics-based cluster wide media extent maps. An exemplary environment which facilitates dynamic space allocation and includes communication of data and metadata between compute nodes and I/O nodes is described below in relation to FIG. 5.

Exemplary Allocation of Space and Data Placement in FAM

FIG. 1 illustrates a diagram 100 of an exemplary allocation of space in a FAMfs (or a cluster or a distributed filesystem), in accordance with an aspect of the present application. In the FAMfs, FAM address space can be organized into a series of chunks, while the storage media of the FAM itself can be allocated in units of "extents." An extent can be a minimum unit of FAM allocation from a single FAM module. The system can organize data extents (which are allocated from different FAM modules) into "slabs" to facilitate implementation of a data protection scheme (which can be set at the file level). The system can allocate the extents from each FAM module, and the extents can be numbered sequentially within a respective FAM module. Thus, any available FAM extent within the cluster can be uniquely identified by an extent identifier, which can be a combination of the FAM identifier ("FAM id") and an extent number, as described below in relation to FIG. 3.

Diagram 100 illustrates a FAM module 110, which is allocated in units of extents, such as extents 112 (which includes at least an extent 114, an extent 116, and an extent 118). Each extent can include chunks of data, such as chunks 120 (which includes at least chunks 121-128). FAM module 110 can be one of a plurality of FAM modules 130 in the cluster of diagram 100. Data extents 144, 146, and 148 can be from different FAM modules and can be organized into a slab 142 of a plurality of slabs 140.

A data structure referred to as a "slab map" can define how physical FAM extents allocated from FAM modules (e.g., of different I/O nodes) are combined into a slab to implement a specific data protection scheme. The slab map can describe the geometry and construction of a layout, i.e., which FAM extents are placed together to form a respective slab to support a specific protection scheme. For example, a 7D+P Redundant Array of Inexpensive Disks (RAID)-5 protection scheme can require eight extents allocated from FAM modules of different I/O nodes to form a slab. The slab map can translate the extent identifier (i.e., the combination of the FAM id and the extent number) into a FAM address within a specific FAM module. Both the extent size and the chunk size can be configurable, e.g., set during the creation of the filesystem layout to match the I/O patterns and the storage requirements.

Within a single filesystem, the system can support multiple protection schemes (e.g., filesystem layouts), each with different protection levels (e.g., number of parity chunks), stripe widths, and chunk sizes. This allows the system or a user to select a specific protection scheme and/or chunk size at the time of file creation by associating the file with a specific filesystem layout.

A slab can be used as a container for "stripes" (e.g., by serving as a container for allocation of stripes). A stripe is a collection of data chunks with the same protection level as its respective container slab. A stripe is a minimum unit of file space allocation and may contain one or more parity chunks to provide the desired protection scheme for a given file. For example, slabs 140 can be containers for stripes 150. Specifically, slab 142 can be a container for a stripe 152. That is, stripe 142 can include data chunks 154, 156, and 158, where each of those chunks belongs to an extent which is allocated to slab 142. Thus: chunk 154 of stripe 152 can be associated with or belong to extent 144; chunk 156 of stripe 152 can be associated with or belong to extent 146; and chunk 158 of stripe 152 can be associated with or belong to extent 148. Stripe 152 and its chunks 154, 156, and 158 may be supported with the same protection level as their container slab (slab 142). An exemplary diagram indicating a layout of FAM modules, slabs, stripes, and metadata maps is described below in relation to FIG. 3. The system can track the status of a stripe in a "claim vector" data structure which can indicate one of four states for a respective stripe, as described below.

Because the system organizes the data chunks into stripes, the system can calculate parity information or erasure codes (ECs). The system can also store the parity information and the erasure codes (parity/EC) in pre-allocated parity chunks when a given stripe is full or upon a file close command or an fsync( ) command. The EC calculation may also be triggered explicitly from an application by a filesystem application program interface (API), e.g., upon completion of an N-N checkpoint. The EC calculation may subsequently be used to reconstruct the original data if any of the data chunks in the given stripe become inaccessible due to a FAM component failure or an I/O node failure.

Figure 2:
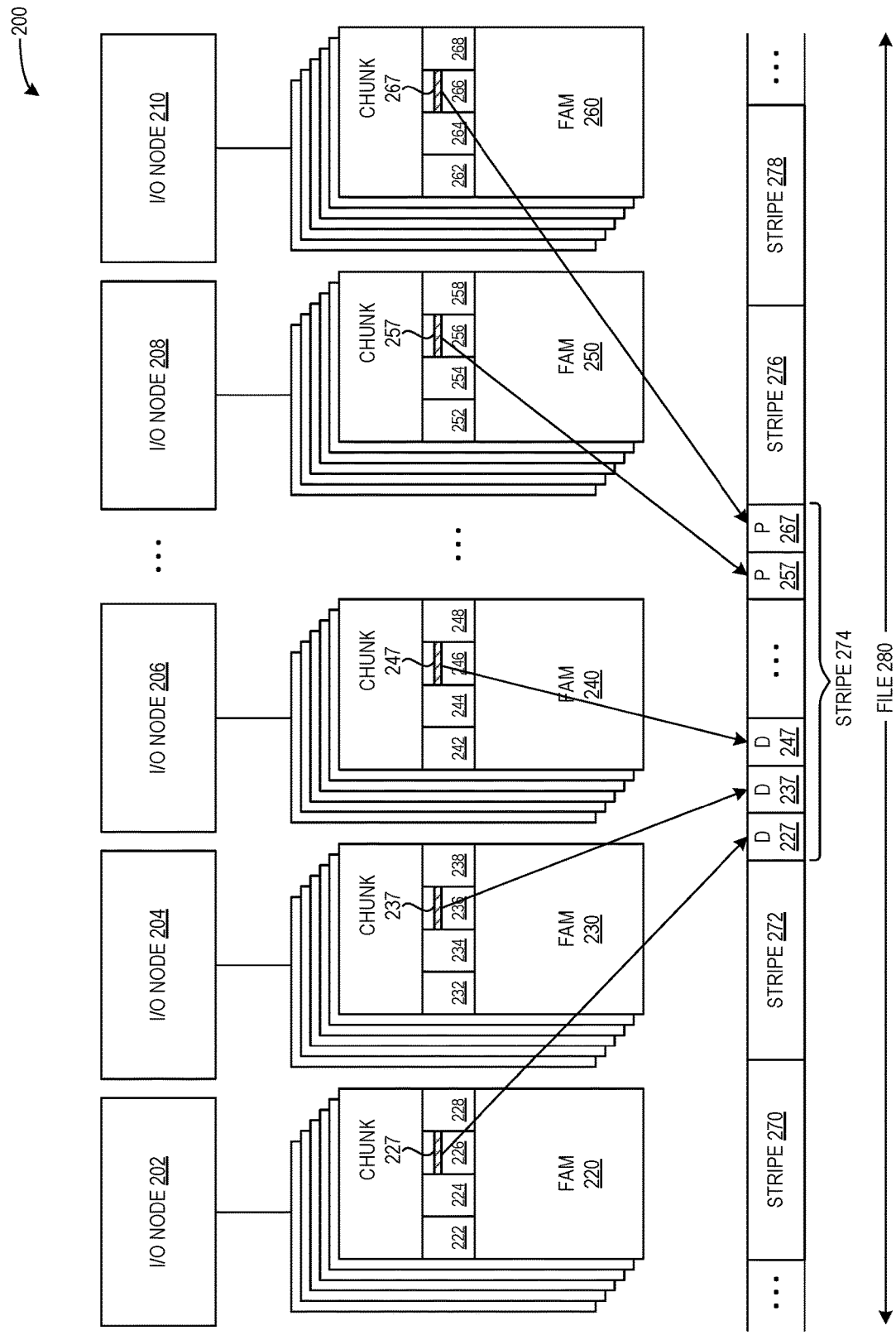
FIG. 2 illustrates a diagram of an exemplary placement of data in FAM, in accordance with an aspect of the present application.

FIG. 2 illustrates a diagram 200 of an exemplary placement of data in FAM, in accordance with an aspect of the present application. Diagram 200 can include a plurality of I/O nodes 202, 204, 206, 208, and 210. Each I/O node can communicate with or be connected, coupled, or accessible to a plurality of FAM modules, e.g., over a Gen-Z fabric, as described below in relation to FIG. 4. In a Gen-Z cluster, each I/O node can communicate with any FAM module. Certain I/O nodes may retain "ownership" and maintain a fault domain relationship with a certain set of FAM modules. For example: I/O node 202 can communicate with a FAM module 220; I/O node 204 can communicate with a FAM module 230; I/O node 206 can communicate with a FAM module 240; I/O node 208 can communicate with a FAM module 250; and I/O node 210 can communicate with a FAM module 260. In some aspects, NVM modules may be physically installed into I/O nodes, and those NVM modules may not be directly accessible to other I/O nodes.

As described above in relation to FIG. 1, the storage media of FAM modules can be allocated in units of extents. For example: FAM 220 can include extents 222, 224, 226, and 228; FAM 230 can include extents 232, 234, 236, and 238; FAM 240 can include extents 242, 244, 246, and 248; FAM 250 can include extents 252, 254, 256, and 258; and FAM 260 can include extents 262, 264, 266, and 268.

The system can store a file 280 in multiple stripes, including stripes 270, 272, 274, 276, and 278. Each stripe can include a certain number of data chunks and parity chunks, where each chunk belongs to an extent from a different FAM module. For example, stripe 274 is depicted as having at least 3 data chunks (D 227, D 237, and D 247) and at least two parity chunks (P 257 and P 267). Furthermore: D 227 can correspond to a chunk 227 from extent 226 of FAM 220; D 237 can correspond to a chunk 237 from extent 236 of FAM 230; D 247 can correspond to a chunk 247 from extent 246 of FAM 240; P 257 can correspond to a chunk 257 from extent 256 of FAM 250; and P 267 can correspond to a chunk 267 from extent 266 of FAM 260.

Thus, the filesystem data can be organized in chunks of a predefined size, and the chunks can be further organized into stripes with additional parity chunks to provide redundancy for data recovery. In order for a data protection scheme to be effective, all data chunks are generally placed in the storage media in a manner which eliminates a single point of failure. In one aspect of this application, an allocation strategy which places each stripe chunk on FAM modules (or Non-Volatile Memory Express (NVMe) devices) from different fault domains (e.g., FAM boards or I/O nodes) can protect the filesystem from the failure of any single component.

In addition, the number of parity chunks in the data protection scheme can determine the minimum number of component failures that a filesystem can survive or withstand without a loss of data. The system can use erasure codes to protect against more than a double component loss, and can use an Exclusive OR (XOR) or RAID-6 style parity to provide maximum performance. The FAMfs can also use a de-clustered allocation strategy which can reduce the overhead of data recovery from a component failure.

Exemplary Layout of FAM Modules (Slabs, Extents, Stripe, Chunks, and Metadata Maps)

The FAMfs can implement a distributed key-value store (DKVS) to store metadata. The DKVS can enable scalable metadata indexing such that a global view of the data may be quickly generated in order to facilitate fast read operations. The system can hash all key-value pairs, creating ranges, and can distribute the hashed key-value pairs in ranges among key-value range servers which run on multiple I/O nodes, as described below in relation to FIG. 5. Each such key-value range server can be referred to as a "partition" or a "partition server," and can be responsible for a specific range of data. As a result, many processes from a parallel application can quickly retrieve the appropriate metadata and form a global view of the layout of a shared file. The filesystem layouts can support protection schemes, and the filesystem layouts can serve as logical containers of the pre-constructed stripes of a specific geometry to match their corresponding protection schemes. A filesystem layout can be implemented as a collection of slabs which combine physical extents from different FAM modules in order to support the layout protection scheme.

The system can use different storage media (e.g., NVMe devices instead of FAM modules) to create a filesystem layout in order to support a multi-tier filesystem. As discussed above, each slab is a container of stripes which have the same geometry as the respective slab.

The system can store file data in filesystem stripes as log-structure writes or data segments. The system can pre-allocate parity chunks for all protected data layout stripes, and can populate the pre-allocated parity chunks after filling the stripe data chunks. In one aspect of the application, the system can use a special "scratch" layout to temporarily store the data prior to the parity/EC calculation, if necessary, e.g., to optimize access by memory side accelerators (MSAs) when used to offload the EC calculation. The system can allocate slabs in the scratch layout from the same FAM module. In such a case, after the system calculates the EC/parity, the system can move the data from the scratch stripes to the protected layout stripes.

Figure 3:
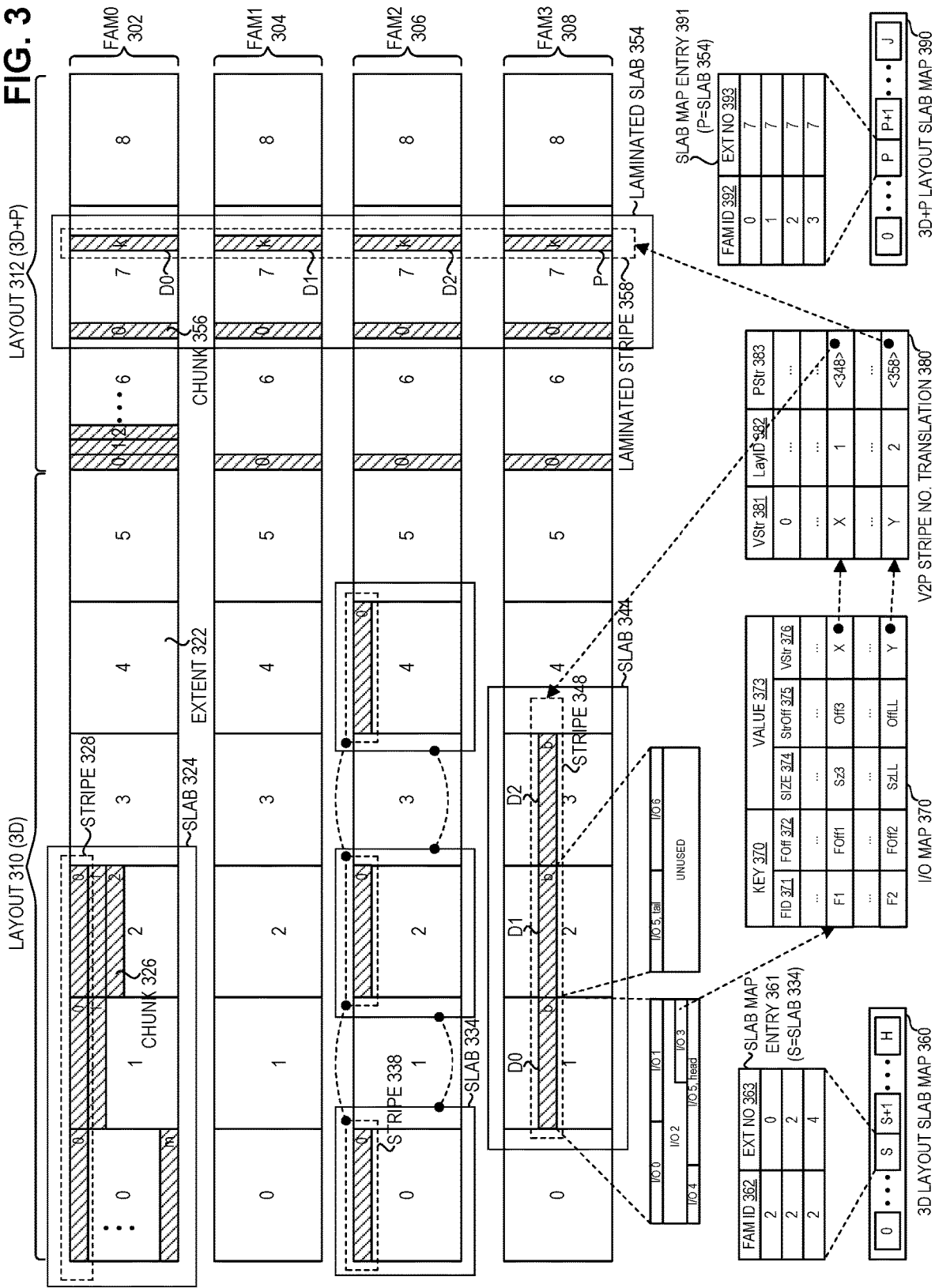
FIG. 3 illustrates a diagram indicating an exemplary layout of FAM modules, slabs, stripes, and metadata maps, in accordance with an aspect of the present application.

The system can maintain and store metadata for the filesystem in a set of data structures or maps. FIG. 3 illustrates a diagram 300 indicating an exemplary layout of FAM modules, slabs, stripes, and metadata maps, in accordance with an aspect of the present application. Diagram 300 can include four FAM modules: a FAM0 module 302; a FAM1 module 304; a FAM2 module 306; and a FAM3 module 308 ("FAM modules 302-308"). Each of FAM modules 302-308 can include nine extents, and each extent can include a number of chunks. Diagram 300 indicates two separate layouts: a layout 310 (3D, which depicts three data chunks per stripe); and a layout 312 (3D+P, which depicts three data chunks and one parity chunk per stripe). The size of each chunk can be configured differently for each layout, while the extent size is set on filesystem creation.

Diagram 300 can include slabs with extents in a same FAM module and slabs with extents from different FAM modules. As examples of slabs with extents in the same module: a slab 324 can include extents 0, 1, and 2 of FAM0 module 302; a slab 334 can include extents 0, 2, and 4 of FAM2 module 306; and a slab 344 can include extents 1, 2, and 3 of FAM3 module 308. As an example of a slab with extents from different FAM modules: a slab 354 can include extent 7 from each of FAM modules 302-308.

Diagram 300 also depicts various stripes which are contained in the slabs. For example: slab 324 contains a stripe 328, which includes a chunk labeled "0" from each of extents 0, 1, and 2 of FAM0 module 302; slab 334 contains a stripe 338, which includes a chunk labeled "0" from each of extents 0, 2, and 4 of FAM2 module 306; and slab 344 contains a stripe 348, which includes a chunk labeled "b" from each of extents 1, 2, and 3 of FAM3 module 308. As another example: slab 354 contains a stripe 358, which includes a chunk labeled "k" from extent 7 of each of FAM modules 302-308. Slab 354 can be a "laminated" slab, and stripe 358 can be a "laminated" stripe, which indicates that a parity or EC data has been calculated and included as part of the data stored in the chunks of laminated stripe 358 and laminated slab 354. Laminated stripe 358 can include three data chunks (labeled as "D0", "D1," and "D2") and one parity chunk (labeled as "P").

FAMfs metadata can be stored in a set of data structures or maps, which can be stored in a DKVS. In one aspect, FAMfs can use Multi-dimensional Hashed Indexed Middleware (MDHIM) as developed by Los Alamos National Laboratory (LANL). A first data structure is the "slab map," which can describe the geometry of a layout, i.e., which FAM extents are organized together to form spaces which support a specific protection scheme. As an example, to support an 8D+2P protection scheme, the system can create a corresponding layout with slabs which contain ten FAM extents (which are allocated from different FAM modules) of different I/O nodes. In the slab map, the key can be the slab number, and the value can be an array of extent entries which include an identifier for a given FAM module (FAM id) and the extent number within the given FAM module. As described above, slabs can serve as container for the allocation of stripes. The system can implement the slab map using a persistent partitionable distributed map ("F-Map").

Diagram 300 includes two slab maps, one for each of layouts 310 and 312: a 3D layout slab map 360 (with a layout identifier of "1"); and a 3D+P layout slab map 390 (with a layout identifier of "2"). Slab map 360 can include entries with keys of {0, . . . , S, S+1, . . . H}. The value for a slab map entry 361 can correspond to S=slab 334, and can include an array of pairs which includes a FAM id 362 and an extent number 363 for each extent in the slab. Slab map entry 361 thus indicates a value of: {(2, 0), (2, 2), (2, 4)}. Similarly, slab map 390 can include entries with keys of {0, . . . , P, P+1, . . . J}. The value for a slab map entry 391 can correspond to P=slab 354, and can include an array of pairs which includes a FAM id 392 and an extent number 393 for each extent in the slab. Slab map entry 391 thus indicates a value of: {(0, 7), (1, 7), (2, 7), (3, 7)}. The "H" in slab map 360 and the "J" in slab map 390 can indicate the size of the respective slab map or the number of slabs.

A second data structure is a "claim vector" (not shown in diagram 300), which can indicate a state of each stripe in the distributed filesystem. That is, the claim vector can indicate, for each stripe in a layout, one of four states: free; pre-allocated; allocated; and laminated (i.e., EC has been calculated). The system can implement the claim vector using an F-Map as a two-bit bitmap.

A third data structure is the "I/O map," which can indicate a mapping of I/O segments to a virtual stripe number. Processes in a parallel program can create a global shared file, and in response, the system can generate a key-value pair for each I/O segment. In the I/O map, the key can include a hash of the file identifier ("FID") and a logical offset of the I/O segment in the shared file ("FOff"). The value can include the virtual stripe number, the data offset (within the stripe), and the length of the I/O segment. The key-value pairs for all the I/O segments can provide a complete I/O map for a file. Similar to how UnifyFS (from Lawrence Livermore National Laboratory (LLNL)) maps I/O segments in a file to physical blocks/chunks in a local burst buffer (i.e., a local filesystem or a memory buffer), the described aspects map I/O segments to a virtual stripe of a global filesystem.

Diagram 300 includes an I/O map 370, which includes entries with a key 370 and a value 373. The system can store a plurality of I/O segments in a chunk of a stripe. In the chunk labeled "b" in extent 1 of slab 344, the system can store I/O segments corresponding to: I/O 0; I/O 1; I/O 2; I/O 3; I/O 4; and I/O 5 (head). In the chunk labeled "b" in extent 2 of slab 344, the system can store I/O segments corresponding to I/O 5 (tail) and I/O 6, with an "Unused" portion following the data stored as part of I/O 6. Assume that I/O 3 is associated with a file with an FID of "F1" and an FOff of "FOff1." The system can maintain, in I/O map 370, an entry for this file. The key 370 can include an FID 371 of "F1" and an FOff 372 of "FOff1." The value 373 can include: a size 374 of "Sz3"; a stripe offset ("StrOff") 375 of "Off3"; and a virtual stripe number ("VStr") 376 of "X."

Similarly, for a file contained in laminated stripe 358, the system can maintain, in I/O map 370, a corresponding entry. The key 370 can include an FID 371 of "F2" and an FOff 372 of "FOff2." The value 373 can include: a size 374 of "SzLL"; a StrOff 375 of "OffLL"; and a VStr 376 of "Y."

The system can translate the virtual stripe number in the I/O map into a physical stripe using a fourth data structure, which is the "virtual-to-physical stripe translation table." The virtual-to-physical ("V2P") stripe translation table can map a virtual stripe number (as the key) to a layout identifier and a physical stripe number within the given layout (as the value). This allows the system to move stripes of data to different physical locations without the need to update the I/O map, which can result in a reduced consumption of both memory and processor resources.

Diagram 300 includes a V2P stripe number translation table 380, with entries which include: a virtual stripe number ("VStr") 381; a layout identifier ("LayID") 382; and a physical stripe number ("PStr") 383. VStr 381 can be the key for each entry, which maps to LayID 382 and PStr 383. For example, for the VStr 381 key of "X," the corresponding LayID 382 is "1" and the corresponding PStr 383 is "<348>," which corresponds to a physical location in stripe 348.

Similarly, for the file contained in laminated stripe 358, the system can maintain, in V2P stripe number translation table 380, a corresponding entry. For the VStr 381 key of "Y," the corresponding LayID 382 is "2" and the corresponding PStr 383 is "<358>," which corresponds to a physical location in stripe 358.

A fifth data structure is the "extent map" (not shown in diagram 300), which can be a bitmap that tracks whether extents on a FAM module (or at the NVMe device level) are used or free. The FAM extent map can be implemented using the Libfabric atomics based cluster-wide FAM extent map, which can be based on a global bitmap array to support space allocation access across all FAM modules without the need for cluster-wide locks.

Each FAM module and NVMe device owned by the filesystem can be registered in the filesystem media table, which can contain: the device type; the device identifier; a capacity of the device; and a location of the device (e.g., relative to one or more given I/O nodes).

The system can distribute all metadata maps (except for the I/O map) across multiple I/O nodes, and can implement these distributed metadata maps in memory as dynamic user read-copy-update (UCRU) Judy arrays, which are high-performance associative arrays. The system can split the metadata maps into partitions, where the allocation and mapping functions can be compartmentalized per each respective partition. Metadata partitions can be non-contiguous segments of filesystem defined by the I/O node index for each allocator and a factor associated with interleaving a respective metadata map. This scheme can allow for an easy re-partitioning, e.g., if the configuration must be changed due to the failure of an I/O node.

Exemplary Environments and Communications for Facilitating Dynamic FAM Space Allocation and Data Placement In aspects of the present application, the system can implement a dynamic topology-aware space allocation by using allocator modules/threads in I/O nodes and allocator helper modules/threads in compute nodes. One goal of the described space allocation is to achieve the highest possible I/O bandwidth by spreading allocations evenly across all available FAM modules in the filesystem pool. Another goal is to eliminate or reduce contention for space allocation by performing an aggressive pre-allocation at both the I/O node allocator level and the compute node allocator helper level, where each respective module can maintain pre-allocated stripes per layout. Yet another goal is to eliminate or reduce contention between allocator processes which operate on different I/O nodes by partitioning metadata maps used by the different I/O nodes, and further by using the Libfabric atomics based cluster-wide media extent maps.

Furthermore, the described aspects can support data protection by placing data extents in a manner which eliminates a single point of failure, as described above in relation to FIG. 2. The described aspects can also support multiple filesystem layouts with different geometries and protection levels as well as multiple data tiers.

In FAMfs, space allocation can be performed by the allocator threads running on each I/O node, where one allocator thread runs on each I/O node. To avoid unnecessary contention and locking, each allocator can allocate slabs for its own partition. By distributing the metadata maps across multiple I/O nodes, the system can compartmentalize, per partition, the functions of allocation, data encoding/recovery/verification, and mapping.

The system can partition the FAMfs virtual space into a number of partitions which match the number of I/O nodes used by the FAMfs. These partitions can be non-contiguous segments of filesystem space which are defined by the index of each I/O node for a given allocator. For example, a filesystem with four I/O nodes can include: an I/O node 0 allocator module which owns slabs 0, 4, 8, 12, . . . ; an I/O node 1 allocator module which owns slabs 1, 5, 9, 13, . . . ; etc. As described above, this scheme can allow for easy re-partitioning, e.g., if the configuration must be changed due to the failure of an I/O node. The system can map each partition to the local key-value store for a given I/O node.

Figure 4:
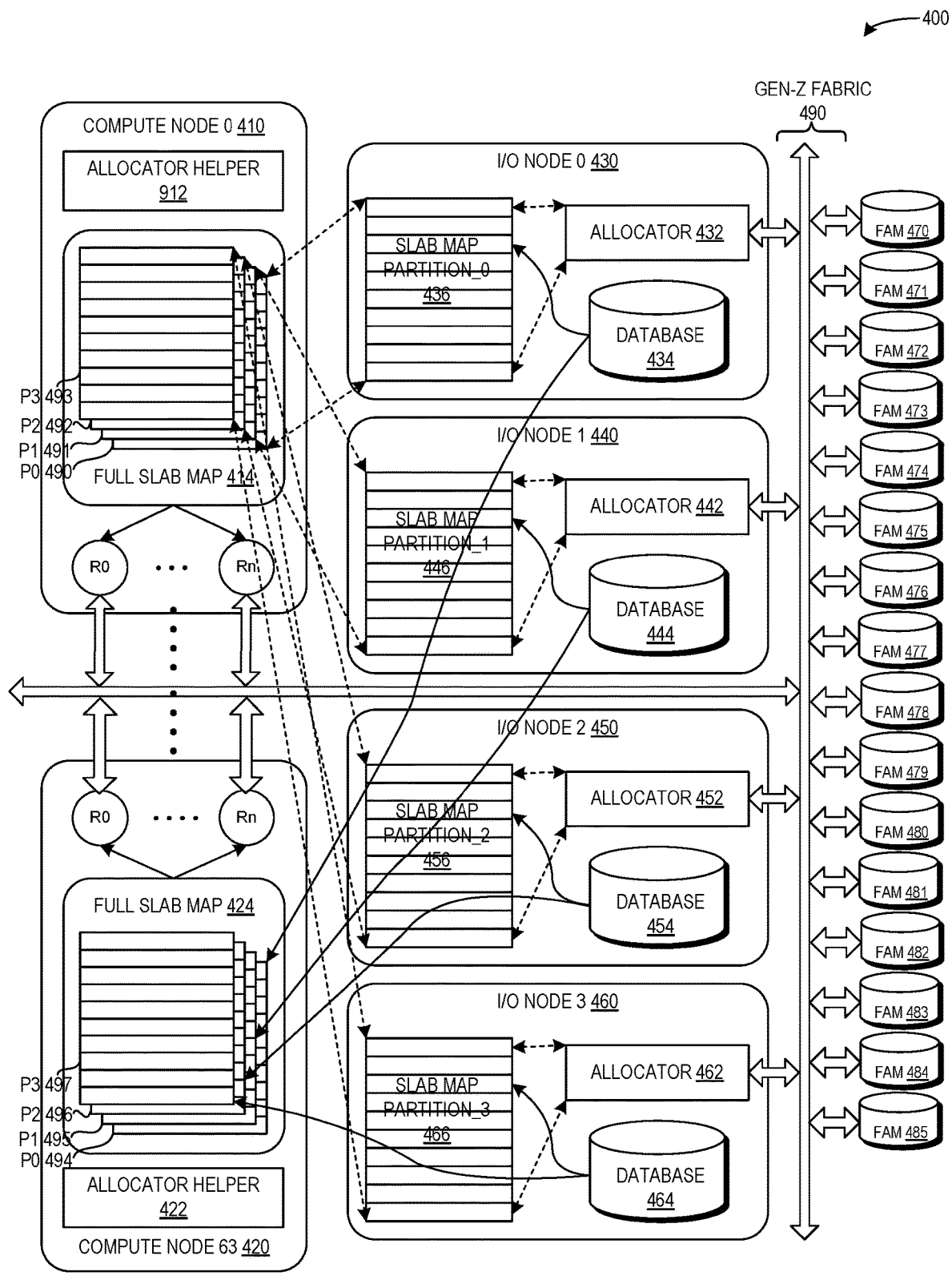
FIG. 4 illustrates an exemplary environment for facilitating placement of data in a distributed system, in accordance with an aspect of the present application.

FIG. 4 illustrates an exemplary environment 400 for facilitating placement of data in a distributed system, in accordance with an aspect of the present application. Environment 400 can indicate a distributed system such as a FAMfs which includes: a plurality of compute nodes, such as a compute node 0 410 and a compute node 63 420; a plurality of I/O nodes, such as an I/O node 0 430, an I/O node 1 440, an I/O node 2 450, and an I/O node 3 460; and a plurality of fabric attached memory (FAM) modules 470-485.

The compute nodes and the I/O nodes of environment 400 can communicate with each other over a network, and the I/O nodes can communicate with the FAM modules over a Gen-Z fabric 490. Each I/O node can include an allocator module, a local backend storage device, and a partition of a global distributed map, such as a slab map in the FAMfs. For example, I/O node 0 430 can include an allocator 432, a database 434, and a slab map partition_0 436. I/O node 1 440 can include an allocator 442, a database 444, and a slab map partition_1 446. I/O node 2 450 can include an allocator 452, a database 454, and a slab map partition_2 456. I/O node 3 460 can include an allocator 462, a database 464, and a slab map partition_3 466.

Each compute node can include an allocator helper module, and a full slab map, e.g., a shared F-Map or an F-Map in shared memory accessible and used by multiple processes within a respective compute node. For example, compute node 0 410 can include an allocator helper 412 and a full slab map 414, which can be accessed by multiple processes RO to Rn on compute node 0 410. Similarly, compute node 63 420 can include an allocator helper 422 and a full slab map 424, which can be accessed by multiple processes RO to Rn on compute node 63 420.

In environment 400, I/O nodes can maintain and access slab map partitions. Specifically, each allocator can retrieve its slab map partition from its database and maintain the partition in memory. For example, I/O node 3 460 can maintain slab map partition_3 466, and can retrieve partition_3 from and flush an updated partition_3 to database 464 (as depicted by the pair of dashed arrows from allocator 462 to slab map partition_3 466 and by the arrow from database 464 to slab map partition_3 466). Similarly: I/O node 0 430 can maintain slab map partition_0 436, and can retrieve partition_0 from and flush an updated partition_0 to database 434 (as depicted by the pair of dashed arrows from allocator 432 to slab map partition_0 436 and by the arrow from database 434 to slab map partition_0 436); I/O node 1 440 can maintain slab map partition_1 446, and can retrieve partition_1 from and flush an updated partition_1 to database 444 (as depicted by the pair of dashed arrows from allocator 442 to slab map partition_1 446 and by the arrow from database 444 to slab map partition_1 446); and I/O node 2 450 can maintain slab map partition_2 456, and can retrieve partition_2 from and flush an updated partition_2 to database 454 (as depicted by the pair of dashed arrows from allocator 452 to slab map partition_2 456 and by the arrow from database 454 to slab map partition_2 456).

Allocator threads are spawned from the filesystem server processes (one per layout) started on the I/O nodes. Upon initial startup, the allocator threads can allocate a predefined number of slabs for their respective partitions, update the slab map, pre-allocate a sufficient number of stripes to meet a first predetermined threshold (e.g., a high watermark), update the claim vector map to mark the pre-allocated stripes as pre-allocated, and place the pre-allocated stripes on a pre-allocated stripes list. These operations are described below in relation to FIGS. 5, 6A, and 6B. As stripes are taken from the list and the stripe count falls below a second predetermined threshold (e.g., a low watermark), the allocator threads can pre-allocate more free stripes in order to maintain the list.

In order to implement and ensure an effective data protection scheme, the system must place all chunks in a manner which eliminates a single point of failure. The system can achieve this by placing each stripe chunk on media from different fault domains, which can protect from the failure of any single component. Aspects of the described system can thus organize all media devices into failure domain groups, referred to as "allocation groups" based on their physical location (e.g., the same FAM board or the same I/O node). For all protected layouts, the allocator threads can allocate no more than one extent for each slab from each allocation group.

The system can use a two-dimensional (2D) matrix with allocation groups in the rows and FAM modules of each allocation group in the columns. Using this 2D matrix can facilitate quick allocations. Upon startup of an allocator, the system can build the matrix based on the FAM configuration, and the system can automatically re-sort the matrix based on FAM utilization within each allocation group after each slab allocation. As a result, the top row of the 2D matrix should always contain a list of the least utilized FAM modules across allocation groups from which to allocate slab extents.

As described above, the system can use two allocation strategies when selecting the FAM modules from which to perform allocation. The first strategy is a default strategy which attempts to spread allocation evenly across all FAM modules in the filesystem pool. The goal of this first strategy is to achieve the highest possible bandwidth by distributing I/O evenly across all FAM modules. The second strategy attempts to maintain an even utilization of media across all the FAM modules in the filesystem pool. The system can be configured to implement this strategy automatically upon detecting a significant uneven utilization, e.g., as defined by an allocator parameter, such as if differently sized FAM modules are used or when new FAM modules are added to the filesystem pool. The goal of this second strategy is to maximize the usage of all available media in the distributed system.

On subsequent restarts, the allocator threads can load their respective portions of the slab map and the claim vector into memory from the metadata store. The allocator threads can scan these maps to verify the integrity of the maps and to build the extent maps for the subset of media device (e.g., FAM modules, etc.) which are owned by a respective I/O node. To prevent double allocation of media extents, the system cannot allocate any new slabs before this process is completed by all allocator threads for all filesystem layouts on all I/O nodes. However, the system can still allocate stripes from the existing slabs. During the loading of the claim vector, the system can add previously pre-allocated threads back to the pre-allocated list and can also allocate more stripes (if necessary to meet the high watermark threshold). The system can also allocate additional slabs, if needed, after the system loads all maps for all filesystem layouts and builds all media extent maps.

Of all the metadata maps used in the FAMfs, the extent maps are the only points of contention, because they cannot be partitioned. The extent maps can be implemented as bitmap arrays shared over Libfabric by their respective I/O nodes. The extent maps can be atomically updated using Libfabric atomic operations with automatic retries on atomic update failures. This lockless scheme can be especially effective in a low-contention environment where most update operations are effective on the first try. Even in the case of high contention, this lockless scheme can be as effective as a spinlock.

Client processes in compute nodes can access the F-Map in shared memory directly from the metadata store (e.g., in a read-only mode). Specifically, each allocator helper module in a compute node can manage and access a complete slab map, e.g., the global map or the F-Map, in shared memory accessed by all client processes R0 to Rn. Each allocator helper module can retrieve all slab map partitions directly from a database of an I/O node.

For example, compute node 63 420 can retrieve a partition_3 from database 464 of I/O node 3 460 (as depicted by the arrow from database 464 to a partition P3 497 of full slab map 424). Compute node 63 420 can also retrieve other partitions from databases of other I/O nodes, e.g.: partition_2 from/to database 454, as depicted by the arrow from database 454 to a partition P2 496 of full slab map 424; partition_1 from/to database 444, as depicted by the arrow from database 444 to a partition P1 495 of full slab map 424; and partition_0 from/to database 434, as depicted by the arrow from database 434 to a partition P0 494 of full slab map 424. These operations can eliminate the need for additional metadata requests in order to resolve the stripe address and offset in FAMfs.

Figure 5:
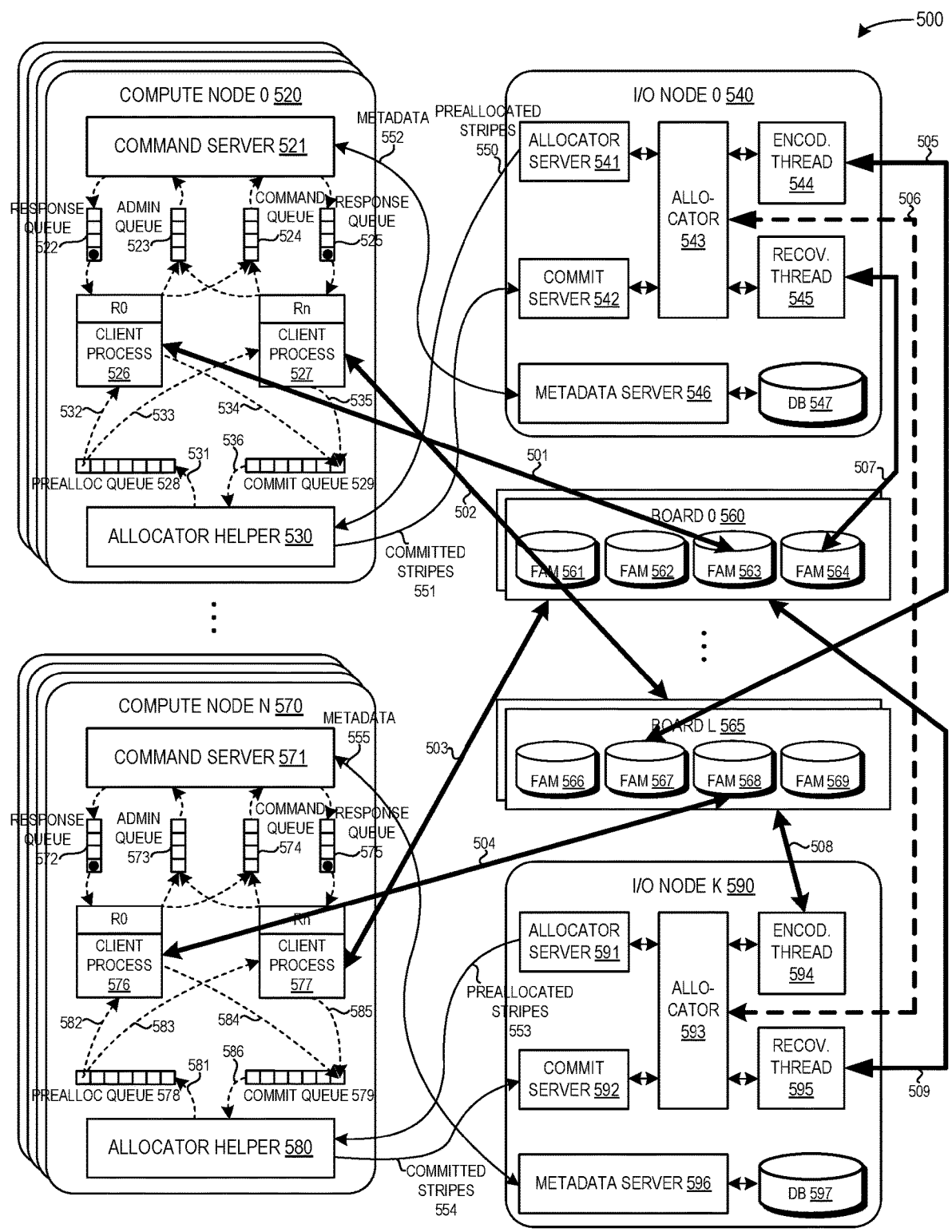
FIG. 5 illustrates an exemplary environment for facilitating dynamic allocation of space in a FAM filesystem, in accordance with an aspect of the present application.

FIG. 5 illustrates an exemplary environment 500 for facilitating dynamic allocation of space in a FAM filesystem, including data/metadata flows which are triggered by client file operations (such as write, read, and fsync), in accordance with an aspect of the present application. Environment 500 can include: a plurality of compute nodes, such as a compute node 0 520 and a compute node N 570; a plurality of I/O nodes, such as an I/O node 0 540, and an I/O node K 590; and a plurality of boards with FAM modules, such as a board 0 560 with FAM modules 561-564 and a board L 565 with FAM modules 566-569.

Each compute node can include a command server, a set of response/admin/command queues, multiple client processes, a pre-allocation queue, a commit queue, and an allocator helper module. Each I/O node can include an allocator server, a commit server, an allocator, an encoding thread or module, a recovery thread or module, a metadata server, and a database.

For example, compute node 0 520 can include: a command server 521; a response queue 522, an admin queue 523, a command queue 524, and a response queue 525; a plurality of client processes, including a client process 526 with a rank of "R0" and a client process 527 with a rank of "Rn"; a pre-allocation queue 528; a commit queue 529; and an allocator helper module 530. Queues 522-525, 528, and 529 can be implemented as shared memory, e.g., by using "/dev/shm." The system can use queues 522-525 in shared memory to handle operations and data related to client processes and for the command server. I/O node 0 540 can include: an allocator server 541; a commit server 542; an allocator module 543; an encoding thread 544; a recovery thread 545; a metadata server 546; and a database (DB) 547. DB 547 can be a key-value store, e.g., a LevelDB.

The dashed curved lines with arrows (such as 531-536 and 581-586) can indicate a shared memory access, while the solid curved lines with arrows (such as 550-555) can indicate Message Passing Interface (MPI) traffic. The thick solid lines with arrows (such as 501-505 and 507-509) can indicate Remote Direct Memory Access (RDMA) traffic using, e.g., Libfabric, while the thick dashed line with arrows (e.g., 506) can indicate atomic RDMA traffic using, e.g., Libfabric.

As described above, each process can store its data to pre-allocated FAM chunks which are organized in stripes. The system always appends new data to the stripe, e.g., storing data via log-structured writes. Using such log-structured writes, the system can store all segments from one process together regardless of the global logical position of a respective segment with respect to data from other processes.

The system can perform aggressive pre-allocation of FAM space during write processes to ensure that compute processes do not have to wait for space allocation. The system, by the allocator modules running on each I/O node, can allocate FAMfs stripes and distribute the allocated stripes to the allocator helper modules running on the compute nodes. Each allocator helper module can be responsible for storing lockless shared memory-based per-layout pre-allocation queues. For example, allocator 543 of I/O node 0 540 can allocate slabs and update in a slab map (as depicted in FIGS. 3 and 4) an entry to indicate the relevant information. The updated slab map entry may be part of a slab map partition. Allocator 543, via allocator server 541, can distribute the allocated stripes as pre-allocated stripes 550 to allocator helper 530 of compute node 0 520. Allocator helper 530 can place the pre-allocated stripes in a list, such as pre-allocation queue 528 (via a communication 531).

A writer process can begin by obtaining a first stripe from the pre-allocation queue for the file layout. The writer process can directly access the shared memory-based slab map to resolve the stripe number and stripe offset in the metadata record of the I/O map into a FAM address and FAM offset, and can also issue the write to the corresponding FAM modules. When the first stripe is filled, the system can place the stripe in the commit queue and can obtain a next stripe from the pre-allocation queue, as needed. For example, client process 526 can obtain a first stripe from pre-allocation queue 528 (via an access 532), and access the shared memory-based slab map (the full slab map as depicted in FIG. 4) to resolve the stripe number/offset in the I/O map into an FAM address/offset of an identified FAM module. After the first stripe is filled, client process 526 can place the filled first stripe in commit queue 529 (via an access 534), and can obtain a next stripe if needed (not shown).

The allocator helper commit thread can obtain completed stripes from the commit queue and forward the completed stripes to the I/O node commit server thread. The I/O node commit server thread can mark those completed stripes as "allocated" in the claim vector metadata map of the filesystem. The I/O node commit server thread can also submit the completed stripes to the encoding thread or the recovery thread. The system can transfer the encoded data from the I/O node to a respective FAM module. For example, allocator helper 530 can obtain completed stripes from commit queue 529 (via an access 536) and forward the completed stripes as committed stripes 551 to commit server 542 of I/O node 0 540. Commit server 542 can mark the committed stripes as "allocated" in the claim vector map (not shown). Commit server 542 can also submit committed stripes 551 to encoding thread 544 or recovery thread 545 for processing (via allocator 543). The system can transfer the encoded data (e.g., parity) between encoding thread 544 of I/O node 0 540 and FAM module 567 of board L 565 (via an RDMA communication 505). The system can also transfer the recovered data (e.g., data which can include data and parity) between recovery thread 545 and FAM module 564 (via an RDMA communication 507).

In a flush (e.g., fsync) operation, the system can commit all commit queues to the FAM modules and can also update the sync records accumulated by each writer process in shared memory. If a write cache is enabled, the system can also store the sync records in the pre-process write cache to improve read performance.

In addition, each allocator module in an I/O node can register an allocated memory buffer as an LFA partition to contain extent maps for the media owned by that I/O node. Once an LFA for global extent maps is created on all I/O nodes, each I/O node can directly access the extent maps via RDMA, e.g., as indicated by a communication 506 between allocators 543 and 593.

A reader process in a compute node can begin by posting "get metadata" requests to its respective command queue (in shared memory). The corresponding command server in the compute node can process these requests by dividing the metadata requests into ranges and forwarding the divided requests to the corresponding metadata range-servers running on the I/O nodes, similar to the process performed by the UnifyFS. The system can post results to the per-process response queues (in shared memory), which can wake up a waiting reader process.

In some aspects, the system can store the metadata records in the per-process read cache if that option is enabled. Even if the read cache is not enabled, the system may only drop the metadata records covering the last read request if the current reader process has no use for them. This can result in a dramatic improvement in performance for read requests which are smaller than the size of the filesystem stripe. Each reader process can subsequently access the shared memory-based slab map to resolve the stripe number/offset in the I/O map metadata record into a FAM address/offset, and can issue the read to the corresponding FAM modules.

For example, client process 527 can post, in command queue 524 in the shared memory of compute node 0 520, a request for metadata associated with the read request. Based on the request, command server 521 can divide the metadata request into ranges. Command server 521 can forward a metadata request to and receive a response from, e.g., metadata server 546 (via a metadata 552 communication). Command server 521 can post results from the response to response queue 525, which can wake up a waiting reader process (client process 527). Client process 527 can access the shared memory-based slab map (the full slab map as depicted in FIG. 4) to resolve the stripe number/offset in the I/O map into an FAM address/offset of an identified FAM module, and issue the read request to the identified FAM module at the determined physical location, e.g., to one of the FAM modules on board L 565 (via an RDMA communication 502).

The communications depicted within and between each of compute node N 570 and I/O node K 590 can be similar to the communications described above for compute node 0 520 and I/O node 0 540.

Dynamic Erasure Code Encoding and Recovery

The aspects of the described system can facilitate dynamic erasure encoding/decoding/recovery ("EDR") in parallel with the I/O. Upon generating the parity information, the system can write the parity information out to storage devices for each unit of the FAMfs allocation (or stripe). Thus, each stripe in a protected layout can include both data chunks and parity chunk(s). The system can initiate the process of encoding a stripe after a client process has completed writing to the stripe and committed the stripe to lamination, i.e., declares that the stripe is done and can no longer be changed. The system can perform the encoding process on the I/O node to which the stripe belongs, so that the encoding process need not require any further attention from the client process. In the event of a device failure (or multiple failures, depending on the protection scheme), the system can restore the data by using redundant chunks. The system can then write the restored data to a new device which replaces the failed device.

Because the data encoding is performed in parallel with the user I/O process, the system can limit the number of stripes which are encoded in parallel (e.g., the number of pre-allocated requests) to minimize the impact on the fabric. The system can place the remainder of the committed stripes on a backlog queue to wait for available resources. On the other hand, during the recovery process, the system can perform I/O and decoding in larger increments, which can result in a reduction in overhead and an increase in the speed of the data recovery process.

The encoding process can begin by issuing a read request on all data chunks. During the data recovery process, the system initiates reads on all "healthy" chunks, whether the chunks are data chunks or parity chunks. While the encoding process only issues chunk-sized I/Os, the data recovery process can use as many chunks as will fit in its buffer queue. The I/O's for all chunks can be submitted in parallel and without waiting. The thread can move immediately to the next request in line and continue until the work queue is empty. The system can control the number of I/O's in flight based on the configurable number of pre-allocated requests.

The data recovery thread can begin when the allocator module detects a failed device or devices in the current configuration. The allocator can go through all the slab maps and replace references to the failed device with a chosen replacement device. The system can choose the replacement device based on utilization and other considerations, such as allocation groups, etc. After the system has replaced all the failed chunks with chunks from healthy FAM modules (either from a specific module or from the filesystem pool), the system can begin the data recovery process. The recovery thread can go through all the slabs which are affected by the device replacement and submit EDR requests. When the system has recovered all the used stripes (which are marked as allocated or laminated in the claim vector) in the slab, the system can mark the failed extent in that slab as recovered (e.g., clear the failed bit). When the system has recovered all slabs in all I/O node partitions, the filesystem layout can return to a healthy state.

While the system is in a degraded state, the system can exclude all failed/unavailable components from new allocations. As a result, the system can handle application write errors by simply taking a new stripe from the allocator helper queue and using the new stripe to store the previously failed I/O. Because the filesystem can treat all updates as new writes and never overwrites the existing data, the system does not need to recover any data once the offline component comes back online. When a user application encounters a read error, the filesystem can queue up a recovery request for the recovery server. If the background recovery is not already running, the system can initiate the background recovery. The system can place a higher priority on user-initiated recovery requests than on background recovery. It can be expected that the latency of a degraded read operation may increase due to the additional read operations and the overhead associated with the reconstruction of the data.

In an aspect of this application, the EDR module or subsystem can use a pool of worker threads that perform Reed-Solomon erasure coding. Because this is a compute-intensive operation, the size of the thread pool can be set to allow the EDR subsystem to utilize the maximum amount of central processing unit (CPU) resources without unnecessary context switching. The size of the thread pool is a configurable number and should not exceed the number of available physical cores in the CPU complex of the I/O node. The threads in the pool can normally sleep on a condition variable and are awakened as the need for computation arises. Depending on the configuration, separate queues with different priorities can be used by any of the encoding, recovery, or data verification threads or processes, which can allow a user to prioritize these operations.

Furthermore, the EDR subsystem can support the use of FAM memory side accelerators (MSAs) to perform data movement and data protection/recovery. The advantage of using MSAs in this manner can include: distributed and faster EC calculations due to a higher aggregate memory bandwidth and potentially higher aggregate compute power (in the production version); not overloading the CPUs of I/O nodes with compute- and memory-intensive EC calculations; and a reduced amount of data transferred over the fabric to perform EC calculations.

Figure 6A:
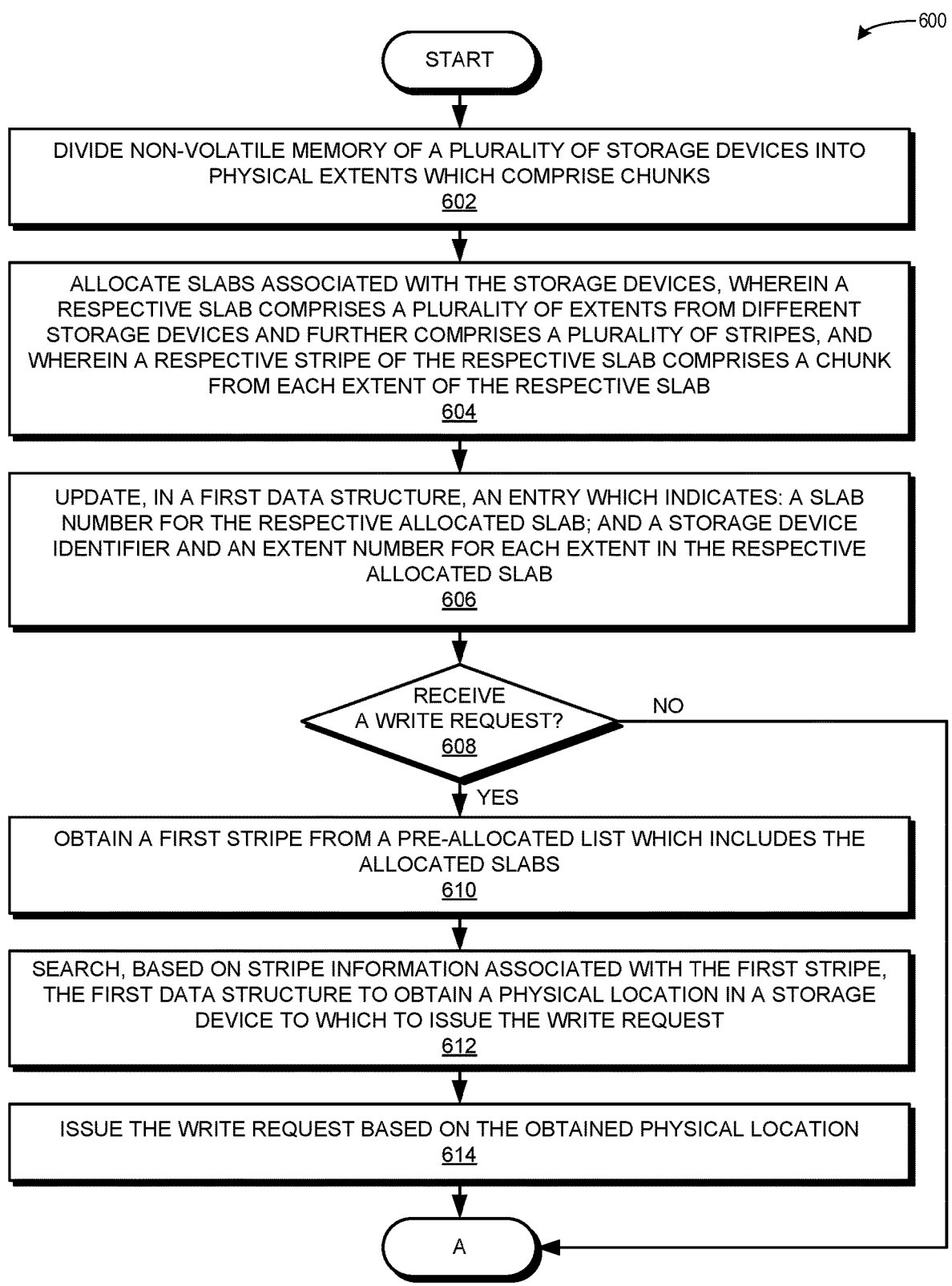
FIG. 6A presents a flowchart illustrating a method which facilitates dynamic allocation of space in a distributed filesystem, in accordance with an aspect of the present application.

Exemplary Method which Facilitates Dynamic Allocation of Space in a Distributed Filesystem FIG. 6A presents a flowchart 600 illustrating a method which facilitates dynamic allocation of space in a distributed filesystem, in accordance with an aspect of the present application. During operation, the system divides non-volatile memory of a plurality of storage devices into physical extents which comprise chunks (operation 602). The system allocates slabs associated with the storage devices, wherein a respective slab comprises a plurality of extents from different storage devices and further comprises a plurality of stripes, and wherein a respective stripe of the respective slab comprises a chunk from each extent of the respective slab (operation 604). The system can calculate the initial number of slabs to allocate as the number of available FAM modules in the layout divided by the number of devices in the slab. This can ensure that all layout devices are used in the initial allocation. The system updates, in a first data structure, an entry which indicates: a slab number for the respective allocated slab; and a storage device identifier and an extent number for each extent in the respective allocated slab (operation 606). The first data structure can be a slab map. The system can allocate the slabs in order to pre-allocate a sufficient number of stripes in these slabs to meet a first predetermined threshold (e.g., a high watermark). As the system uses or fills these pre-allocated stripes and the number of stripes falls below a second predetermined threshold (e.g., a low watermark, the system can pre-allocate additional free stripes (e.g., to meet the first predetermined threshold or high watermark), as described below in relation to FIG. 6B. Pre-allocated stripes are placed on the pre-allocated stripes list. The allocator's pre-allocated stripes list is a hash list with hash function based on the FAM ids in slabs to which pre-allocated stripes belong. This allows the allocators to distribute stripes to the allocation helpers with the goal of achieving a maximum uniform I/O distribution across as many FAM modules as possible.

Figure 6B:
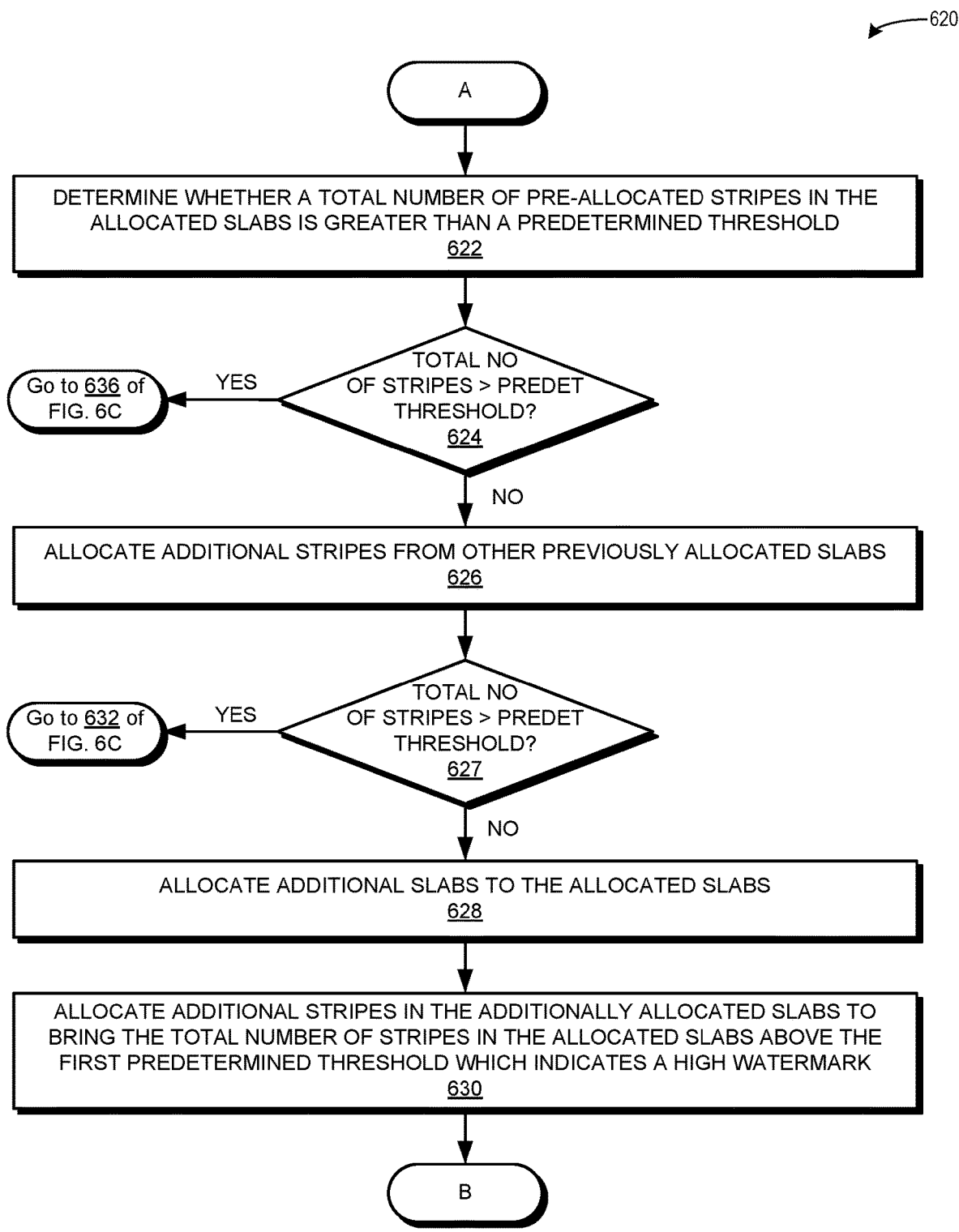
FIG. 6B presents a flowchart illustrating a method which facilitates dynamic allocation of space in a distributed filesystem, in accordance with an aspect of the present application.

If the system does not receive a write request (decision 608), the operation continues at Label A of FIG. 6B. If the system receives a write request (decision 608), the system obtains a first stripe from a pre-allocated list which includes the allocated slabs (operation 610). The system searches, based on stripe information associated with the first stripe, the first data structure to obtain a physical location in a storage device to which to issue the write request (operation 612). The system issues the write request based on the obtained physical location (operation 614), and the operation continues at Label A of FIG. 6B. Note that the system handles write requests in parallel to the allocation process.

FIG. 6B presents a flowchart 620 illustrating a method which facilitates dynamic allocation of space in a distributed filesystem, in accordance with an aspect of the present application. During operation, the system determines whether a total number of pre-allocated stripes in the allocated slabs is greater than a predetermined threshold (operation 622) (e.g., a second predetermined threshold which indicates a low watermark). If the total number of stripes is greater than the (second) predetermined threshold (decision 624), the allocator can go to sleep, and the operation continues at operation 636 of FIG. 6C. If the total number of stripes is not greater than the (second) predetermined threshold (decision 624), the system first attempts to allocate additional stripes from other previously allocated slabs (i.e., slabs which have already been allocated) (operation 626).

Figure 6C:
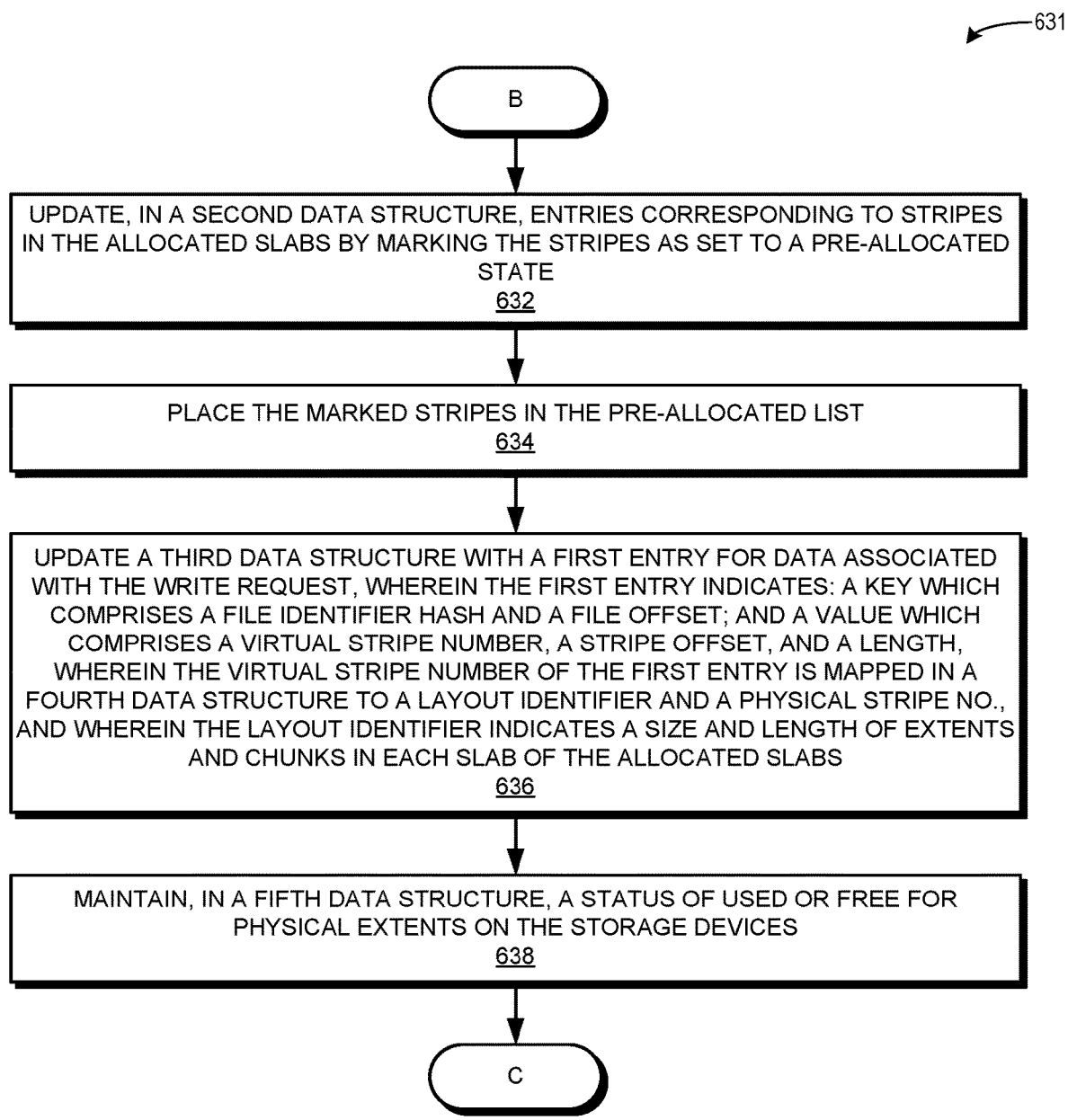
FIG. 6C presents a flowchart illustrating a method which facilitates dynamic allocation of space in a distributed filesystem, in accordance with an aspect of the present application.

If the total number of stripes (now based on any additional stripes allocated from the previously allocated slabs) is greater than the (second) predetermined threshold (decision 627), the system continues at operation 632 of FIG. 6C. If the total number of stripes is not greater than the (second) predetermined threshold (decision 627), the system allocates additional slabs to the allocated slabs (which were allocated in operation 604 of FIG. 6A) (operation 628). The system can then allocate additional stripes in the additionally allocated slabs to bring the total number of stripes in the allocated slabs above the first predetermined threshold which indicates a high watermark (operation 630), and the operation continues at Label B of FIG. 6C.

FIG. 6C presents a flowchart 631 illustrating a method which facilitates dynamic allocation of space in a distributed filesystem, in accordance with an aspect of the present application. The system updates, in a second data structure, entries corresponding to stripes in the allocated slabs by marking the stripes as set to a pre-allocated state (operation 632). The second data structure can be a claim vector, which can maintain one of four states for each stripe: unallocated/ free; pre-allocated; allocated; and laminated. The system places the marked stripes in the pre-allocated list (operation 634).

The system can also update a third data structure with a first entry for data associated with the write request, wherein the first entry indicates: a key which comprises a file identifier hash and a file offset; and a value which comprises a virtual stripe number, a stripe offset, and a length, wherein the virtual stripe number of the first entry is mapped in a fourth data structure to a layout identifier and a physical stripe number, and wherein the layout identifier indicates a size and length of extents and chunks in each slab of the allocated slabs (operation 636). The system can also maintain, in a fifth data structure, a status of used or free for physical extents on the storage devices (operation 638). The third data structure can be I/O map, the fourth data structure can be a V2P stripe translation table, and the fifth data structure can be an extent map. The operation continues at Label C of FIG. 6D.

Figure 6D:
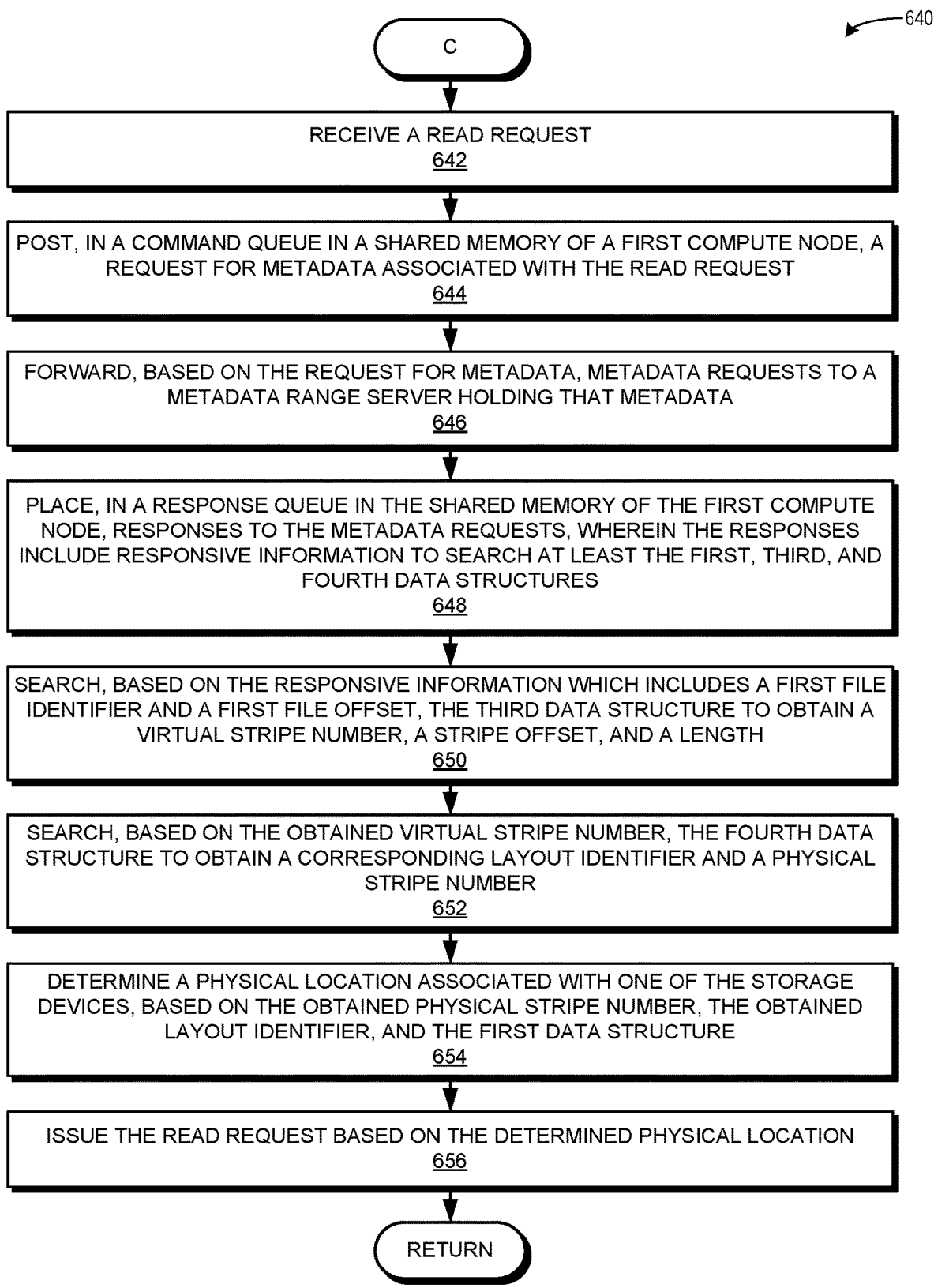
FIG. 6D presents a flowchart illustrating a method which facilitates dynamic allocation of space in a distributed filesystem, including processing a read request, in accordance with an aspect of the present application.

FIG. 6D presents a flowchart 640 illustrating a method which facilitates dynamic allocation of space in a distributed filesystem, including processing a read request, in accordance with an aspect of the present application. During operation, the system receives a read request (operation 642). The system posts, in a command queue in a shared memory of a first compute node, a request for metadata associated with the read request (operation 644). The system forwards, based on the request for metadata, metadata requests to a metadata range server holding that metadata (operation 646). The system places, in a response queue in the shared memory of the first compute node, responses to the metadata requests, wherein the responses include responsive information to search at least the first, third, and fourth data structures (operation 648). The system searches, based on the responsive information which includes a first file identifier and a first file offset, the third data structure to obtain a virtual stripe number, a stripe offset, and a length (operation 650). The system searches, based on the obtained virtual stripe number, the fourth data structure to obtain a corresponding layout identifier and a physical stripe number (operation 652). The system determines a physical location associated with one of the storage devices, based on the obtained physical stripe number, the obtained layout identifier, and the first data structure (operation 654). The system issues the read request based on the determined physical location (operation 656), and the operation returns.

Exemplary Computer System and Apparatus

Figure 7:
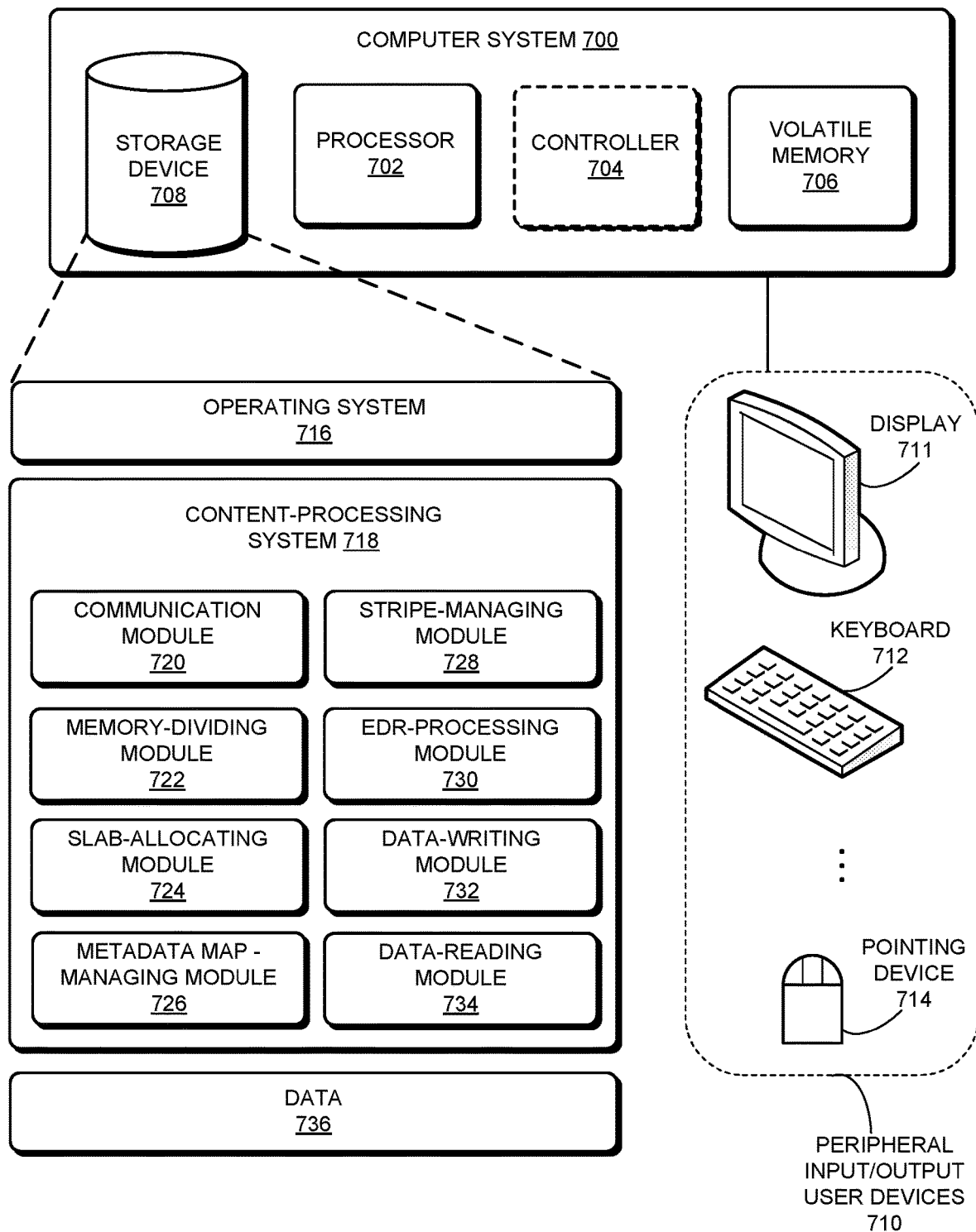
FIG. 7 illustrates an exemplary computer system which facilitates dynamic allocation of space in a distributed filesystem, in accordance with an aspect of the present application.

FIG. 7 illustrates an exemplary computer system 700 which facilitates dynamic allocation of space in a distributed filesystem, in accordance with an aspect of the present application. Computer system 700 includes a processor 702, a volatile memory 706, and a storage device 708. In some aspects, computer system 700 can include a controller 704 (indicated by the dashed lines). Volatile memory 706 can include, e.g., random access memory (RAM), that serves as a managed memory, and can be used to store one or more memory pools. Storage device 708 can include persistent storage which can be managed or accessed via processor 702 (or controller 704). Furthermore, computer system 700 can be coupled to peripheral input/output (I/O) user devices 710, e.g., a display device 711, a keyboard 712, and a pointing device 714. Storage device 708 can store an operating system 716, a content-processing system 718, and data 736.

Content-processing system 718 can include instructions, which when executed by computer system 700, can cause computer system 700 or processor 702 to perform methods and/or processes described in this disclosure. Specifically, content-processing system 718 can include instructions for receiving and transmitting data packets, including metadata and data associated with allocating a slab or stripe (communication module 720).

Content-processing system 718 can further include instructions for dividing non-volatile memory of a plurality of storage devices into physical extents which comprise chunks (memory-dividing module 722). Content-processing system 718 can include instructions for allocating slabs associated with the storage devices, wherein a respective slab comprises a plurality of extents from different storage devices and further comprises a plurality of stripes, and wherein a respective stripe of the respective slab comprises a chunk from each extent of the respective slab (slab-allocating module 724). Content-processing system 718 can include instructions for updating, in a first data structure, an entry which indicates: a slab number for the respective allocated slab; and a storage device identifier and an extent number for each extent in the respective allocated slab (metadata map-managing module 726). Content-processing system 718 can include instructions for, responsive to receiving a write request (communication module 720), obtaining stripes from a pre-allocated list (stripe-managing module 728). Content-processing system 718 can include instructions for searching, based on stripe information associated with the first stripe, the first data structure to obtain a physical location in a storage device to which to issue the write request (metadata map-managing module 726). Content-processing system 718 can include instructions for issuing the write request based on the obtained physical location (data-writing module 732).

Content-processing system 718 can additionally include instructions for performing the EDR-related operations described above in the section titled "Dynamic Erasure Code Encoding and Recovery" (EDR-processing module 730). Content-processing system 718 can include instructions for performing the operations described in relation to flowchart 640 of FIG. 6C (data-reading module 734). Content-processing system 718 can include instructions for maintaining, updating, accessing, managing, and searching any of the five data structures or metadata maps described herein (metadata map-managing module 726), including: the slab map, the claim vector, the I/O map, the V2P stripe translation table, and the extent map.

Data 736 can include any data that is required as input or generated as output by the methods and/or processes described in this disclosure.

Figure 8:
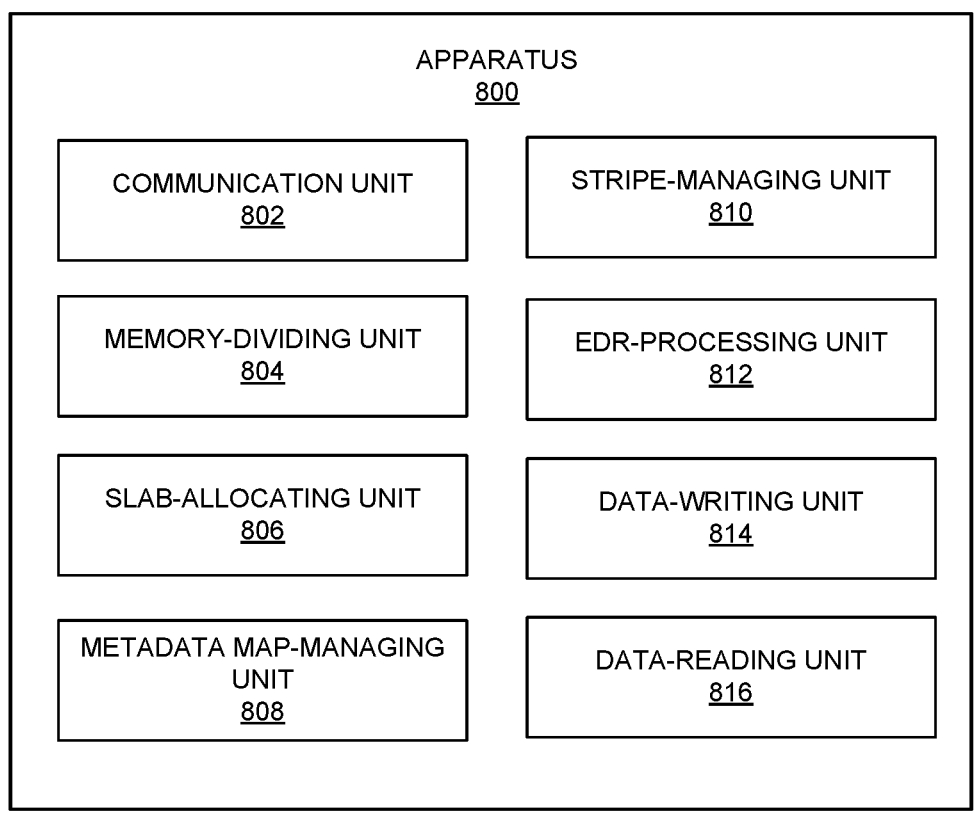
FIG. 8 illustrates an exemplary apparatus which facilitates dynamic allocation of space in a distributed filesystem, in accordance with an aspect of the present application.

FIG. 8 illustrates an exemplary apparatus 800 which facilitates dynamic allocation of space in a distributed filesystem, in accordance with an aspect of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Furthermore, apparatus 800 may be integrated in a computer system, or realized as a separate device or devices capable of communicating with other computer systems and/or devices.

Apparatus 800 may also include a non-volatile storage system or a memory management unit. Apparatus 800 can comprise modules or units 802-816 which are configured to perform functions or operations similar to modules 720-734 of computer system 700 of FIG. 7, including: a communication unit 802; a memory-dividing unit 804; a slab-allocating unit 806; a metadata map-managing unit 808; a stripe-managing unit 810; an EDR-processing unit 812; a data-writing unit 814; and a data-reading unit 816.

In general, the disclosed aspects provide a system which facilitates a dynamic topology-aware allocation of space in a distributed system. In one aspect, the system divides non-volatile memory of a plurality of storage devices into physical extents which comprises chunks. The system allocates slabs associated with the storage devices, wherein a respective slab comprises a plurality of extents from different storage devices and further comprises a plurality of stripes, and wherein a respective stripe of the respective slab comprises a chunk from each extent of the respective slab. The system updates, in a first data structure, an entry which indicates: a slab number for the respective allocated slab; and a storage device identifier and an extent number for each extent in the respective allocated slab. Responsive to receiving a write request, the system obtains stripes from a pre-allocated list. The system searches, based on stripe information associated with the first stripe, the first data structure to obtain a physical location in a storage device to which to issue the write request.

In a variation on this aspect, the system determines whether a total number of stripes in the allocated slabs is greater than a predetermined threshold. Responsive to determining that the total number of stripes is not greater than a predetermined threshold, the system allocates additional slabs to the allocated slabs. The system updates, in a second data structure, entries corresponding to stripes in the allocated slabs by marking the stripes as set to a pre-allocated state. The system places the marked stripes in the pre-allocated list.

In a variation on this aspect, the system updates a third data structure with a first entry for data associated with the write request, wherein the first entry indicates: a key which comprises a file identifier hash and a file offset; and a value which comprises a virtual stripe number, a stripe offset, and a length. The virtual stripe number of the first entry is mapped in a fourth data structure to a layout identifier and a physical stripe number, and the layout identifier indicates a size and length of extents and chunks in each slab of the allocated slabs.

In a variation on this aspect, the allocated slabs are associated with a first layout which is defined by the plurality of extents from the different storage devices and is further defined by a chunk size and an extent size. The layout identifier is associated with the first layout.

In a further variation, the first data structure is a shared data structure which is maintained by each of a plurality of compute nodes by obtaining respective partition information from each of a plurality of I/O nodes.

In a further variation, the system receives a read request and posts, in a command queue in a shared memory of a first compute node, a request for metadata associated with the read request. The system forwards, based on the request for metadata, metadata requests to a range server holding that metadata. The system places, in a response queue in the shared memory of the first compute node, responses to the metadata requests, wherein the responses include responsive information to search at least the first, third, and fourth data structures. The system searches, based on the responsive information which includes a first file identifier and a first file offset, the third data structure to obtain a virtual stripe number, a stripe offset, and a length. The system searches, based on the obtained virtual stripe number, the fourth data structure to obtain a corresponding layout identifier and a physical stripe number. The system determines a physical location associated with one of the storage devices, based on the obtained physical stripe number, the obtained layout identifier, and the first data structure. The system issues the read request based on the determined physical location.

In another variation, allocating the slabs is performed by a first I/O node of a plurality of I/O nodes. The system maintains, by the first I/O node, first information associated with the allocated slabs as a first partition of the shared data structure, wherein the first data structure is stored in a shared memory of compute nodes which obtain the first partition from the I/O node and obtain other partitions from other I/O nodes.

In a further variation, the system issues the write request based on the obtained physical location.

In a further variation, the system maintains, in a fifth data structure, a status of used or free for physical extents on the storage devices.

In a further variation, a storage device comprises one or more of: a Fabric Attached Memory (FAM) module; and a Non-Volatile Memory Express (NVMe) device.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware devices or apparatus. For example, the hardware devices or apparatus can include, but are not limited to, application-specific integrated circuit (ASIC) chips, field-programmable gate arrays (FPGAs), dedicated or shared processors that execute a particular software program or a piece of code at a particular time, and other programmable-logic devices now known or later developed. When the hardware devices or apparatus are activated, the hardware modules perform the methods and processes included within them.

The foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:
1. A computer-implemented method, comprising:
dividing non-volatile memory of a plurality of storage devices into physical extents which comprise chunks;
allocating slabs associated with the storage devices,
wherein a respective slab comprises a plurality of extents from different storage devices and further comprises a plurality of stripes, and wherein a respective stripe of the respective slab comprises a chunk from each extent of the respective slab;

updating, in a first data structure, an entry which indicates: a slab number for the respective allocated slab; and a storage device identifier and an extent number for each extent in the respective allocated slab;

responsive to receiving a write request, obtaining a first stripe from a pre-allocated list which includes the allocated slabs;

searching, based on stripe information associated with the first stripe, the first data structure to obtain a physical location in a storage device to which to issue the write request;

responsive to determining that a total number of stripes in the allocated slabs is not greater than a predetermined threshold, allocating additional slabs to the allocated slabs;

updating, in a second data structure, entries corresponding to stripes in the allocated slabs by marking the stripes as set to a pre-allocated state; and placing the marked stripes in the pre-allocated list.

2. The method of claim 1, further comprising:
determining whether the total number of stripes in the allocated slabs is greater than a predetermined threshold.

3. The method of claim 2, wherein responsive to determining that the total number of stripes in the allocated slabs is greater than the predetermined threshold, wherein the method further comprises:
updating a third data structure with a first entry for data associated with the write request,
wherein the first entry indicates: a key which comprises a file identifier hash and a file offset; and a value which comprises a virtual stripe number, a stripe offset, and a length,
wherein the virtual stripe number of the first entry is mapped in a fourth data structure to a layout identifier and a physical stripe number, and
wherein the layout identifier indicates a size and length of extents and chunks in each slab of the allocated slabs.

4. The method of claim 3,
wherein the allocated slabs are associated with a first layout which is defined by the plurality of extents from the different storage devices and is further defined by a chunk size and an extent size, and
wherein the layout identifier is associated with the first layout.

5. The method of claim 3, wherein the first data structure is a shared data structure which is maintained by each of a plurality of compute nodes by obtaining respective partition information from each of a plurality of I/O nodes.

6. The method of claim 5, further comprising:
receiving a read request;
posting, in a command queue in a shared memory of a first compute node, a request for metadata associated with the read request;
forwarding, based on the request for metadata, metadata requests to a range server holding the metadata;
placing, in a response queue in the shared memory of the first compute node, responses to the metadata requests, wherein the responses include responsive information to search at least the first, third, and fourth data structures;

searching, based on the responsive information which includes a first file identifier and a first file offset, the third data structure to obtain a virtual stripe number, a stripe offset, and a length;

searching, based on the obtained virtual stripe number, the fourth data structure to obtain a corresponding layout identifier and a physical stripe number;

determining, a physical location associated with one of the storage devices, based on the obtained physical stripe number, the obtained layout identifier, and the first data structure; and issuing the read request based on the determined physical location.

7. The method of claim 1, wherein allocating the slabs is performed by a first I/O node of a plurality of I/O nodes, and wherein the method further comprises:
maintaining, by the first I/O node, first information associated with the allocated slabs as a first partition of the shared data structure,
wherein the first data structure is stored in a shared memory of compute nodes which obtain the first partition from the I/O node and obtain other partitions from other I/O nodes.

8. The method of claim 1, further comprising:
issuing the write request based on the obtained physical location.

9. The method of claim 1, further comprising:
maintaining, in a third data structure, a status of used or free for physical extents on the storage devices.

10. The method of claim 1, wherein a storage device comprises one or more of:
a Fabric Attached Memory (FAM) module; and
a Non-Volatile Memory Express (NVMe) device.

11. A computer system, comprising:
a processor; and
a memory coupled to the processor and storing instructions which, when executed by the processor, cause the processor to perform a method, the method comprising:
dividing non-volatile memory of a plurality of storage devices into physical extents which comprise chunks;
allocating slabs associated with the storage devices,
wherein a respective slab comprises a plurality of extents from different storage devices and further comprises a plurality of stripes, and
wherein a respective stripe of the respective slab comprises a chunk from each extent of the respective slab;
updating, in a first data structure, an entry which indicates: a slab number for the respective allocated slab; and a storage device identifier and an extent number for each extent in the respective allocated slab;
responsive to receiving a write request, obtaining a first stripe from a pre-allocated list which includes the allocated slabs;
searching, based on stripe information associated with the first stripe, the first data structure to obtain a physical location in a storage device to which to issue the write request;
issuing the write request based on the obtained physical location;
responsive to determining that a total number of stripes in the allocated slabs is not greater than a predetermined threshold, allocating additional slabs to the allocated slabs;

updating, in a second data structure, entries corresponding to stripes in the allocated slabs by marking the stripes as set to a pre-allocated state; and placing the marked stripes in the pre-allocated list.

12. The computer system of claim 11, wherein the method further comprises:

determining whether the total number of stripes in the allocated slabs is greater than the predetermined threshold.

13. The computer system of claim 12, wherein responsive to determining that the total number of stripes in the allocated slabs is greater than the predetermined threshold, the method further comprises:

updating a third data structure with a first entry for data associated with the write request, wherein the first entry indicates: a key which comprises a file identifier hash and a file offset; and a value which comprises a virtual stripe number, a stripe offset, and a length, wherein the virtual stripe number of the first entry is mapped in a fourth data structure to a layout identifier and a physical stripe number, and wherein the layout identifier indicates a size and length of extents and chunks in each slab of the allocated slabs.

14. The computer system of claim 13, wherein the allocated slabs are associated with a first layout which is defined by the plurality of extents from the different storage devices and is further defined by a chunk size and an extent size, and wherein the layout identifier is associated with the first layout.

15. The computer system of claim 13, wherein the method further comprises:

receiving a read request;

posting, in a command queue in a shared memory of a first compute node, a request for metadata associated with the read request;

forwarding, based on the request for metadata, metadata requests to a range server holding the metadata;

placing, in a response queue in the shared memory of the first compute node, responses to the metadata requests, wherein the responses include responsive information to search at least the first, third, and fourth data structures;

searching, based on the responsive information which includes a first file identifier and a first file offset, the third data structure to obtain a virtual stripe number, a stripe offset, and a length;

searching, based on the obtained virtual stripe number, the fourth data structure to obtain a corresponding layout identifier and a physical stripe number;

determining, a physical location associated with one of the storage devices, based on the obtained physical stripe number, the obtained layout identifier, and the first data structure; and issuing the read request based on the determined physical location.

16. The computer system of claim 11, wherein allocating the slabs is performed by a first I/O node of a plurality of I/O nodes, and wherein the method further comprises:

maintaining, by the first I/O node, first information associated with the allocated slabs as a first partition of the shared data structure, wherein the first data structure is stored in a shared memory of compute nodes which obtain the first partition from the I/O node and obtain other partitions from other I/O nodes.

17. The computer system of claim 11, further comprising:

maintaining, in a third data structure, a status of used or free for physical extents on the storage devices.

18. The computer system of claim 11, wherein a storage device comprises one or more of:

a Fabric Attached Memory (FAM) module; and a Non-Volatile Memory Express (NVMe) device.

19. A non-transitory computer-readable storage medium storing instructions that when executed by a computer cause the computer to perform a method, the method comprising:

dividing non-volatile memory of a plurality of storage devices into physical extents which comprise chunks;

allocating slabs associated with the storage devices, wherein a respective slab comprises a plurality of extents from different storage devices and further comprises a plurality of stripes, and wherein a respective stripe of the respective slab comprises a chunk from each extent of the respective slab;

updating, in a first data structure, an entry which indicates: a slab number for the respective allocated slab; and a storage device identifier and an extent number for each extent in the respective allocated slab;

responsive to receiving a write request, obtaining a first stripe from a pre-allocated list which includes the allocated slabs;

searching, based on stripe information associated with the first stripe, the first data structure to obtain a physical location in a storage device to which to issue the write request;

responsive to determining that a total number of stripes in the allocated slabs is not greater than a predetermined threshold, allocating additional slabs to the allocated slabs;

updating, in a second data structure, entries corresponding to stripes in the allocated slabs by marking the stripes as set to a pre-allocated state; and placing the marked stripes in the pre-allocated list.

20. The storage medium of claim 19, wherein the method further comprises:

updating a third data structure with a first entry for data associated with the write request, wherein the first entry indicates: a key which comprises a file identifier hash and a file offset; and a value which comprises a virtual stripe number, a stripe offset, and a length, wherein the virtual stripe number of the first entry is mapped in a fourth data structure to a layout identifier and a physical stripe number, wherein the layout identifier indicates a size and length of extents and chunks in each slab of the allocated slabs, wherein the allocated slabs are associated with a first layout which is defined by the plurality of extents from the different storage devices and is further defined by a chunk size and an extent size, and wherein the layout identifier is associated with the first layout;

wherein allocating the slabs is performed by a first I/O node of a plurality of I/O nodes; and maintaining, by the first I/O node, first information associated with the allocated slabs as a first partition of the shared data structure, wherein the first data structure is stored in a shared memory of compute nodes which obtain the first partition from the I/O node and obtain other partitions from other I/O nodes.

\* \* \* \* \*